US012754115B2

(12) United States Patent
Ramakrishnan et al.

(10) Patent No.: US 12,754,115 B2
(45) Date of Patent: Oct. 6, 2026

(54) MEASUREMENT OF FLOW RATE, DENSITY, VISCOSITY, AND RHEOLOGY OF MULTIPHASE FLUIDS IN A PIPE

(71) Applicant: Saudi Arabian Oil Company, Dhahran (SA)

(72) Inventors: Vijay Ramakrishnan, Houston, TX (US); Muhammad Arsalan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 388 days.

(21) Appl. No.: 18/581,986

(22) Filed: Feb. 20, 2024

(65) Prior Publication Data

US 2025/0264393 A1 Aug. 21, 2025

(51) Int. Cl.

*G01N 11/08* (2006.01)
*G01F 1/34* (2006.01)
*G01F 1/74* (2006.01)
*G01N 9/26* (2006.01)

(52) U.S. Cl.

CPC ............... *G01N 11/08* (2013.01); *G01F 1/34* (2013.01); *G01F 1/74* (2013.01); *G01N 9/26* (2013.01)

(58) Field of Classification Search

CPC . G01N 11/08; G01N 9/32; G01N 9/26; G01F 1/34; G01F 1/74

See application file for complete search history.

(56) References Cited

U.S. PATENT DOCUMENTS

| | | | |
|---|---|---|---|
| 3,693,437 | A | 9/1972 | Shiba |
| 3,724,503 | A | 4/1973 | Cooke |
| 3,795,145 | A | 3/1974 | Miller |
| 3,839,914 | A | 10/1974 | Modisette et al. |
| 3,906,792 | A | 9/1975 | Miller |
| 3,926,050 | A | 12/1975 | Turner et al. |
| 4,096,211 | A | 6/1978 | Rameau |
| 4,387,685 | A | 6/1983 | Abbey |
| 4,757,709 | A | 7/1988 | Czernichow |
| 5,591,922 | A | 1/1997 | Segeral et al. |
| 5,880,378 | A | 3/1999 | Behring |
| 6,550,327 | B1 | 4/2003 | Van Berk |

(Continued)

FOREIGN PATENT DOCUMENTS

| | | |
|---|---|---|
| CA | 2264225 | 8/2000 |
| CN | 205483094 U * | 8/2016 |

(Continued)

OTHER PUBLICATIONS

U.S. Appl. No. 17/813,541, filed Jul. 19, 2022, Ramakrishnan.

(Continued)

*Primary Examiner* — Paul M. West

(74) *Attorney, Agent, or Firm* — Fish & Richardson P.C.

(57) ABSTRACT

A fluid flows through a flowmeter system including a first conduit, a U-bend, and a second conduit. Various differential pressures of the fluid flowing through the flowmeter system are measured. The differential pressures of the fluid are measured by various pressure sensors (for example, differential pressure sensors) installed on the flowmeter system. Rheology of the fluid is characterized by performing calculations using the measured differential pressures of the fluid and relative positions of the pressure sensors throughout the flowmeter system.

20 Claims, 13 Drawing Sheets

(56) References Cited

U.S. PATENT DOCUMENTS

| | | | |
|---|---|---|---|
| 6,622,574 | B2 | 9/2003 | Fincke |
| 6,629,564 | B1 | 10/2003 | Ramakrishnan et al. |
| 6,993,979 | B2 | 2/2006 | Segeral |
| 7,261,002 | B1 | 8/2007 | Gysling et al. |
| 7,281,415 | B2 | 10/2007 | Johansen |
| 8,322,228 | B2 | 12/2012 | Xie et al. |
| 8,739,635 | B2 | 6/2014 | Bruno et al. |
| 9,927,270 | B2 | 3/2018 | Xie |
| 11,920,469 | B2 | 3/2024 | Mahalingam et al. |
| 2002/0069022 | A1 | 6/2002 | Fincke |
| 2003/0226395 | A1 | 12/2003 | Storm, Jr. et al. |
| 2007/0220987 | A1 | 9/2007 | Clifton et al. |
| 2010/0300413 | A1 | 12/2010 | Ulrey et al. |
| 2011/0185805 | A1 | 8/2011 | Roux et al. |
| 2011/0296911 | A1 | 12/2011 | Moore et al. |
| 2013/0255370 | A1 | 10/2013 | Roux et al. |
| 2014/0012507 | A1 | 1/2014 | Trehan |
| 2016/0341585 | A1 | 11/2016 | Liu |
| 2018/0156648 | A1 * | 6/2018 | Gimenez .................. G01T 3/00 |
| 2019/0094119 | A1 | 3/2019 | Singh et al. |
| 2024/0027242 | A1 | 1/2024 | Ramakrishnan |
| 2024/0027243 | A1 | 1/2024 | Ramakrishnan |
| 2024/0027317 | A1 | 1/2024 | Ramakrishnan |

FOREIGN PATENT DOCUMENTS

| | | |
|---|---|---|
| CN | 104236644 | 12/2018 |
| EP | 2072971 | 6/2009 |
| EP | 2893301 | 5/2018 |
| FR | 2613089 | 9/1988 |
| WO | WO 1995033980 | 12/1995 |
| WO | WO 2013005091 | 1/2013 |
| WO | WO 2019243789 | 12/2019 |

OTHER PUBLICATIONS

U.S. Appl. No. 17/868,545, filed Jul. 19, 2022, Ramakrishnan.

Alleyne et al., “A 2-dimensional Fourier transform method for the quantitative measurement of Lamb modes,” IEEE Symposium on Ultrasonics, Dec. 1990, 4 pages.

Alleyne et al., “A two-dimensional Fourier transform method for the measurement of propagating multimode signals,” The Journal of the Acoustical Society of America, 1991, 89, 1159, 10 pages.

Almabrok, “Gas-Liquid Two-Phase Flow in Up and Down Vertical Pipes,” Thesis for the Degree of Doctor of Philosophy, Cranfield University, School of Engineering, Department of Offshore, Process and Energy Engineering, Oct. 2013, 298 pages.

ejprescott.com [online], “Water, Sewer and Drain Fittings B-22, Flange Adaptors,” retrieved from URL <https://www.ejprescott.com/media/reference/FlangeAdaptorsB-22.pdf> retrieved on Jun. 15, 2020, available on or before Nov. 2010 via wayback machine URL <http://web.archive.org/web/20101128181255/https://www.ejprescott.com/media/reference/FlangeAdaptorsB-22.pdf>, 5 pages.

Farestvedt, “The Use of Innovative Multi-Phase Flow Meters to Achieve Superior Measurement Accuracy and Reliability, While Lowering Overall Cost of Facility,” 5th Annual Cost-Effective Well Site Facilities Onshore, 2018, retrieved from URL <https://www.lbcg.com/media/downloads/events/693/day-2-lars-farestvedt-general-manager-mpm-western-region-technipfmc.13297.pdf>, 15 pages.

Gul et al., “Automated Surface Measurements of Drilling Fluid Properties: Field Application in the Permian Basin, ” URTeC: 964, Unconventional Resources Technology Conference, Denver, Colorado, United States, Jul. 22-24, 2019, 17 pages.

Hall et al., “Use of Venturi meters in multiphase flow measurements,” Flow Measurement Centre, National Engineering Laboratory, Oct. 1999, retrieved from URL <https://nfogm.no/wp-content/uploads/2019/02/1999-07-Use-of-Venturi-Meters-in-Multiphase-Flow-Measurement-Hall-NEL.pdf>, 21 pages.

Johnson et al., “Real-Time Friction Factor Monitoring: Characterization of Drag Reduction in Polymer-Based Fluids,” AADE-18-FTCE-118, AADE Fluids Technical Conference and Exhibition, Houston, Texas, United States, Apr. 10-11, 2018, 10 pages.

Ma et al., “Flow pattern identification for two-phase flow in a U-bend and its contiguous straight tubes,” Experimental Thermal and Fluid Science, May 2018, 93:218:234, 17 pages.

mccrometer.com [online], “V-Cone Flow Meter,” 2022, retrieved on May 12, 2022, retrieved from URL <https://www.mccrometer.com/v-cone-flow-meter/product?id=52003823651/>, 2 pages.

Meribout et al., “A Multisensor Intelligent Device for Real-Time Multiphase Flow Metering in Oil Fields,” IEEE Transactions on Instrumentation and Measurement, Jun. 2010, 59(6), 13 pages.

omega.com [online], “An introduction to Venturi Flow meters, flow nozzles, and segmental wedge elements,” Apr. 2019, retrieved on May 12, 2022, retrieved from URL <https://www.omega.com/en-us/resources/venturi-meter/>, 10 pages.

omega.com [online], “What is an orifice plate flow meter?” Apr. 2019, retrieved on May 12, 2022, retrieved from URL <https://www.omega.com/en-us/resources/orifice-plate-flow-meter/>, 10 pages.

Ramakrishnan et al., “A non-nuclear inline densitometer for multiphase flows,” Meas. Sci. Technol., Apr. 11, 2023, 34(7), 077002, 8 pages.

Reader-Harris et al., “Best practice guide: Impulse Lines for Differential-Pressure Flow meters,” TUV Nel Ltd., Sep. 2005, retrieved from URL <https://instrumentationforum.com/uploads/db4532/original/2X/6/62692b8203c35c5ca8d16a5b2e7178b54a647d7b.pdf>, 22 pages.

Sharma et al., “Studies on low viscous oil-water flow through return bends,” Experimental Thermal and Fluid Science, Apr. 2011, 35(3):455-469, 15 pages.

slb.com [online], “Vx Spectra Surface multiphase flowmeter,” 2017, retrieved on May 12, 2022, retrieved from URL <https://www.slb.com/-/media/files/testing-services/product-sheet/vx-spectra-surface-multiphase-flowmeter-ps.ashx>, 2 pages.

Stauffer et al., “Multiple tap sets to improve Venturi flowmeters performance characteristics with disturbed flow,” AWWA Water Science, May 1(3):e1134 2019, 9 pages.

Tan et al., “Mass Flow Rate Measurement of Oil-Water Two-Phase Flow by a Long-Waist Cone Meter,” IEEE Transactions on Instrumentation and Measurement, 62(10), Oct. 2013, 10 pages.

Ünalmis et al., “Subsea Multiphase Flowmeter: Performance Tests in Multiphase Flow Loop,” SPE-182378-MS, SPE Asia Pacific Oil & Gas Conference and Exhibition, Perth, Australia, Oct. 25, 2016, 19 pages.

Vajargah et al., “Automated Fluid Rheology and ECD Management,” SPE-180331-MS, SPE Deepwater Drilling and Completions Conference, Galveston, Texas, United States, Sep. 14, 2016, 18 pages.

Zardin et al., “Pressure Losses in Multiple-Elbow Paths and in V-Bends of Hydraulic Manifolds,” Energies, Jun. 2017, 10(6):788, 20 pages.

Ramakrishnan et al., “A non-nuclear inline densitometer for multiphase flows,” Measurement Science and Technology, Apr. 2023, 8 pages.

International Search Report and Written Opinion in International Appln. No. PCT/US2025/016501, mailed on May 22, 2025, 17 pages.

* cited by examiner

300

400

500

MEASUREMENT OF FLOW RATE, DENSITY, VISCOSITY, AND RHEOLOGY OF MULTIPHASE FLUIDS IN A PIPE

TECHNICAL FIELD

This disclosure relates to characterization of the flow of multiphase fluids.

BACKGROUND

A multiphase fluid is a mixture of multiple phases of matter. Multiphase fluids can be non-homogenous and can thus exhibit complex flow characteristics. The characteristics of the flow of multiphase fluids in a conduit, for example, can depend on various factors, such as operating conditions (pressure and temperature), composition (and in turn, physical properties such as density and viscosity) of each of the phases, flow rate of each of the phases, and physical characteristics of the conduit (such as diameter and orientation) through which the multiphase fluid is flowing. Characterization of the flow of multiphase fluids can sometimes be difficult. In some cases, for example, in oil and gas operations, accurate flow metering of multiphase fluid mixtures (such as crude oil, natural gas, and brine) can be important.

A Newtonian fluid is a fluid whose shear stress is proportional to shear rate. The proportionality constant is called the fluid viscosity. Many single-phase fluids (such as water and air) are practically Newtonian fluids under typical conditions (such as atmospheric conditions). In contrast, a non-Newtonian fluid is a fluid whose shear stress changes with shear rate. Some categories of non-Newtonian fluids include plastic fluids, pseudoplastic fluids, and dilatant fluids. Some examples of non-Newtonian fluids include drilling fluids, hydraulic fracturing fluids, and polymer fluids, which can be injected into a subterranean formation to enhance hydrocarbon recovery from such formations.

SUMMARY

This disclosure describes technologies relating to measurement of flow rate, density, viscosity, and rheology of multiphase fluids. Certain aspects of the subject matter described can be implemented as a flowmeter system. The flowmeter system includes a first conduit configured to receive a fluid. The flowmeter system includes a U-bend including a first portion, a second portion, and a connecting portion connecting the first portion to the second portion. The U-bend has a shape configured to change a direction of flow of the fluid, such that a first direction of flow of the fluid through the first portion of the U-bend is different from a second direction of flow of the fluid through the second portion of the U-bend. The flowmeter system includes a second conduit. The first conduit is connected to the first portion of the U-bend, and the second conduit is connected to the second portion of the U-bend. The flowmeter system includes a first differential pressure sensor configured to measure a first differential pressure of the fluid between a first location on the first conduit and a second location on the first portion of the U-bend. The second location is at a first vertical height with respect to the first location. The flowmeter system includes a second differential pressure sensor configured to measure a second differential pressure of the fluid between the first location on the first conduit and a third location on the first portion of the U-bend. The third location is at a second vertical height with respect to the first location. The first and second vertical heights are different. The flowmeter system includes a third differential pressure sensor configured to measure a third differential pressure of the fluid between the second location of the first portion of the U-bend and a fourth location on the second portion of the U-bend. The second location and the fourth location are at the first vertical height with respect to the first location. The flowmeter system includes a fourth differential pressure sensor configured to measure a fourth differential pressure of the fluid between the third location on the first portion of the U-bend and a fifth location on the second portion of the U-bend. The third location and the fifth location are at the second vertical height with respect to the first location. The flowmeter system includes a computer. The computer includes a processor communicatively coupled to the first differential pressure sensor, the second differential pressure sensor, the third differential pressure sensor, and the fourth differential pressure sensor. The computer includes a computer-readable storage medium coupled to the processor and storing programming instructions for execution by the processor. The programming instructions instruct the processor to perform operations that include: determining a mixture density of the fluid at least based on the first vertical height, the second vertical height, a difference between the first differential pressure received from the first differential pressure sensor and the second differential pressure received from the second differential pressure sensor, and a difference between the third differential pressure received from the third differential pressure sensor and the fourth differential pressure received from the fourth differential pressure sensor; and determining a total flow rate of the fluid at least based on the first differential pressure received from the first differential pressure sensor, the mixture density of the fluid, and the first vertical height.

This, and other aspects, can include one or more of the following features. In some implementations, wherein the mixture density of the fluid is determined by:

$$\rho = \frac{(\Delta P_2 - \Delta P_1) - \dfrac{\Delta P_3 - \Delta P_4}{2}}{g \times (h_2 - h_1)},$$

where ρ is the mixture density of the fluid, $\Delta P_1$ is the first differential pressure of the fluid, $\Delta P_2$ is the second differential pressure of the fluid, $\Delta P_3$ is the third differential pressure of the fluid, $\Delta P_4$ is the fourth differential pressure of the fluid, g is an acceleration due to gravity, $h_1$ is the first vertical height, and $h_2$ is the second vertical height. In some implementations, wherein the total flow rate of the fluid is determined by:

$$m_T = C_d \times G_1 \times \sqrt{\rho \times (\Delta P_1 - \rho \times g \times h_1)},$$

where $m_T$ is the total flow rate of the fluid, $C_d$ is a discharge coefficient, and $G_1$ is a geometric coefficient defined as:

$$G_1 = \frac{\pi \times D^2 \times d^2}{\sqrt{8 \times (D^4 - d^4)}},$$

wherein D is an inner diameter of the first conduit, and d is an inner diameter of the first portion of the U-bend. In some implementations, the operations performed by the processor include determining a pressure gradient of the fluid determined by:

$$\nabla P = \frac{\Delta P_3 - \Delta P_4}{2 \times (h_2 - h_1)},$$

wherein ∇P is the pressure gradient of the fluid. In some implementations, the system includes a fifth differential pressure sensor configured to measure a fifth differential pressure of the fluid between the fifth location on the second portion of the U-bend and a sixth location on the second conduit. The fifth location can be at the second vertical height with respect to the sixth location. In some implementations, the system includes a sixth differential pressure sensor configured to measure a sixth differential pressure of the fluid between the fourth location on the second portion of the U-bend and the sixth location on the second conduit. The fourth location can be at the first vertical height with respect to the sixth location. In some implementations, the operations performed by the processor include determining a second mixture density of the fluid determined by:

$$\rho_2 = \frac{(\Delta P_5 - \Delta P_6) - \frac{\Delta P_3 - \Delta P_4}{2}}{g \times (h_2 - h_1)},$$

where $\rho_2$ is the second mixture density of the fluid, $\Delta P_5$ is the fifth differential pressure of the fluid, and $\Delta P_6$ is the sixth differential pressure of the fluid. In some implementations, the operations performed by the processor include recalculating the mixture density of the fluid as an average of ρ and $\rho_2$. In some implementations, the fluid includes a Newtonian fluid, and the operations performed by the processor include determining a viscosity of the fluid at least based on the first differential pressure, the second differential pressure, the third differential pressure, the fourth differential pressure, or any combinations of these. In some implementations, the fluid includes a non-Newtonian fluid, and the operations performed by the processor include generating a first plot of shear stress versus shear rate of the fluid and generating a second plot of friction factor versus Reynolds number of the fluid. In some implementations, the fluid includes a two-phase fluid including an aqueous phase and an oil phase. The two-phase fluid can be free of a gas phase, and the operations performed by the processor can include determining a percentage of the aqueous phase to the fluid at least based on the first differential pressure, the second differential pressure, the third differential pressure, the fourth differential pressure, or any combinations of these.

Certain aspects of the subject matter described can be implemented as a flowmeter system. The flowmeter system includes a first conduit configured to receive a fluid. The flowmeter system includes a U-bend including a first portion, a second portion, and a connecting portion connecting the first portion to the second portion. The U-bend has a shape configured to change a direction of flow of the fluid, such that a first direction of flow of the fluid through the first portion of the U-bend is different from a second direction of flow of the fluid through the second portion of the U-bend. The flowmeter system includes a second conduit. The first conduit is connected to the first portion of the U-bend, and the second conduit is connected to the second portion of the U-bend. The flowmeter system includes a first differential pressure sensor configured to measure a first differential pressure of the fluid between a first location on the first conduit and a second location on the first portion of the U-bend. The second location is at a first vertical height with respect to the first location. The flowmeter system includes a second differential pressure sensor configured to measure a second differential pressure of the fluid between the second location on the first portion of the U-bend and a third location on the first portion of the U-bend. The third location is at a second vertical height with respect to the first location. The first and second vertical heights are different. The flowmeter system includes a third differential pressure sensor configured to measure a third differential pressure of the fluid between a fourth location on the second portion of the U-bend and a fifth location on the second portion of the U-bend. The fourth location is at the second vertical height with respect to the first location, and the fifth location is at the first vertical height with respect to the first location. The flowmeter system includes a computer. The computer includes a processor communicatively coupled to the first differential pressure sensor, the second differential pressure sensor, and the third differential pressure sensor. The computer includes a computer-readable storage medium coupled to the processor and storing programming instructions for execution by the processor. The programming instructions instruct the processor to perform operations including: determining a mixture density of the fluid at least based on the first vertical height, the second vertical height, and a difference between the second differential pressure received from the second differential pressure sensor and the third differential pressure received from the third differential pressure sensor; and determining a total flow rate of the fluid at least based on the first differential pressure received from the first differential pressure sensor, the mixture density of the fluid, and the first vertical height.

This, and other aspects, can include the following feature. In some implementations, the mixture density of the fluid is determined by:

$$\rho = \frac{(\Delta P_2 - \Delta P_3)}{2 \times g \times (h_2 - h_1)},$$

where ρ is the mixture density of the fluid, $\Delta P_2$ is the second differential pressure of the fluid, $\Delta P_3$ is the third differential pressure of the fluid, g is an acceleration due to gravity, $h_1$ is the first vertical height, and $h_2$ is the second vertical height.

Certain aspects of the subject matter described can be implemented as a method. A fluid is flowed through a flowmeter system. The flowmeter system includes a first conduit. The flowmeter system includes a U-bend including a first portion, a second portion, and a connecting portion connecting the first portion to the second portion. A shape of the U-bend changes a direction of flow of the fluid, such that a first direction of flow of the fluid through the first portion of the U-bend is different from a second direction of flow of the fluid through the second portion of the U-bend. The flowmeter system includes a second conduit. The first conduit is connected to the first portion of the U-bend, and the second conduit is connected to the second portion of the U-bend. A first differential pressure of the fluid flowing through the flowmeter system is measured between a first location on the first conduit and a second location on the first portion of the U-bend. The second location is at a first vertical height with respect to the first location. A second differential pressure of the fluid flowing through the flowmeter system is measured between the first location on the first conduit and a third location on the first portion of the U-bend. The third location is at a second vertical height with respect to the first location, and the first and second vertical heights are different. A third differential pressure of the fluid flowing through the flowmeter system is measured between the second location on the first portion of the U-bend and a fourth location on the second portion of the U-bend. The second location and the fourth location are at the first vertical height with respect to the first location. A fourth differential pressure of the fluid flowing through the flowmeter system is measured between the third location on the first portion of the U-bend and a fifth location on the second portion of the U-bend. The third location and the fifth location are at the second vertical height with respect to the first location. A mixture density of the fluid is determined at least based on the first vertical height, the second vertical height, a difference between the first differential pressure and the second differential pressure, and a difference between the third differential pressure and the fourth differential pressure. A total flow rate of the fluid is determined at least based on the first differential pressure, the mixture density of the fluid, and the first vertical height.

This, and other aspects, can include one or more of the following features. In some implementations, the mixture density of the fluid is determined by:

$$\rho = \frac{(\Delta P_2 - \Delta P_1) - \frac{\Delta P_3 - \Delta P_4}{2}}{g \times (h_2 - h_1)},$$

where $\rho$ is the mixture density of the fluid, $\Delta P_1$ is the first differential pressure of the fluid, $\Delta P_2$ is the second differential pressure of the fluid, $\Delta P_3$ is the third differential pressure of the fluid, $\Delta P_4$ is the fourth differential pressure of the fluid, g is an acceleration due to gravity, $h_1$ is the first vertical height, and $h_2$ is the second vertical height. In some implementations, the total flow rate of the fluid is determined by:

$$m_T = C_d \times G_1 \sqrt{\rho \times (\Delta P_1 - \rho \times g \times h_1)},$$

where $m_T$ is the total flow rate of the fluid, $C_d$ is a discharge coefficient, and $G_1$ is a geometric coefficient defined as:

$$G_1 = \frac{\pi \times D^2 \times d^2}{\sqrt{8 \times (D^4 - d^4)}},$$

where D is an inner diameter of the first conduit, and d is an inner diameter of the first portion of the U-bend. In some implementations, the method includes determining a pressure gradient of the fluid determined by:

$$\nabla P = \frac{\Delta P_3 - \Delta P_4}{2 \times (h_2 - h_1)},$$

wherein $\nabla P$ is the pressure gradient of the fluid. In some implementations, the method includes measuring a fifth differential pressure of the fluid between the fifth location on the second portion of the U-bend and a sixth location on the second conduit. The fifth location can be at the second vertical height with respect to the sixth location. In some implementations, the method includes measuring a sixth differential pressure sensor configured to measure a sixth differential pressure of the fluid between the fourth location on the second portion of the U-bend and the sixth location on the second conduit. The fourth location can be at the first vertical height with respect to the sixth location. In some implementations, the method includes determining a second mixture density of the fluid determined by:

$$\rho_2 = \frac{(\Delta P_5 - \Delta P_6) - \frac{\Delta P_3 - \Delta P_4}{2}}{g \times (h_2 - h_1)},$$

wherein $\rho_2$ is the second mixture density of the fluid, $\Delta P_5$ is the fifth differential pressure of the fluid, and $\Delta P_6$ is the sixth differential pressure of the fluid. In some implementations, the method includes recalculating the mixture density of the fluid as an average of $\rho$ and $\rho_2$. In some implementations, the fluid includes a Newtonian fluid, and the method includes determining a viscosity of the fluid at least based on the first differential pressure, the second differential pressure, the third differential pressure, the fourth differential pressure, or any combinations of these. In some implementations the fluid includes a non-Newtonian fluid, and the method includes generating a first plot of shear stress versus shear rate of the fluid and generating a second plot of friction factor versus Reynolds number of the fluid. In some implementations, the fluid includes a two-phase fluid. The two-phase fluid can include an aqueous phase and an oil phase. The fluid can be free of a gas phase, and the method can include determining a percentage of the aqueous phase to the fluid at least based on the first differential pressure, the second differential pressure, the third differential pressure, the fourth differential pressure, or any combinations of these.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1A:
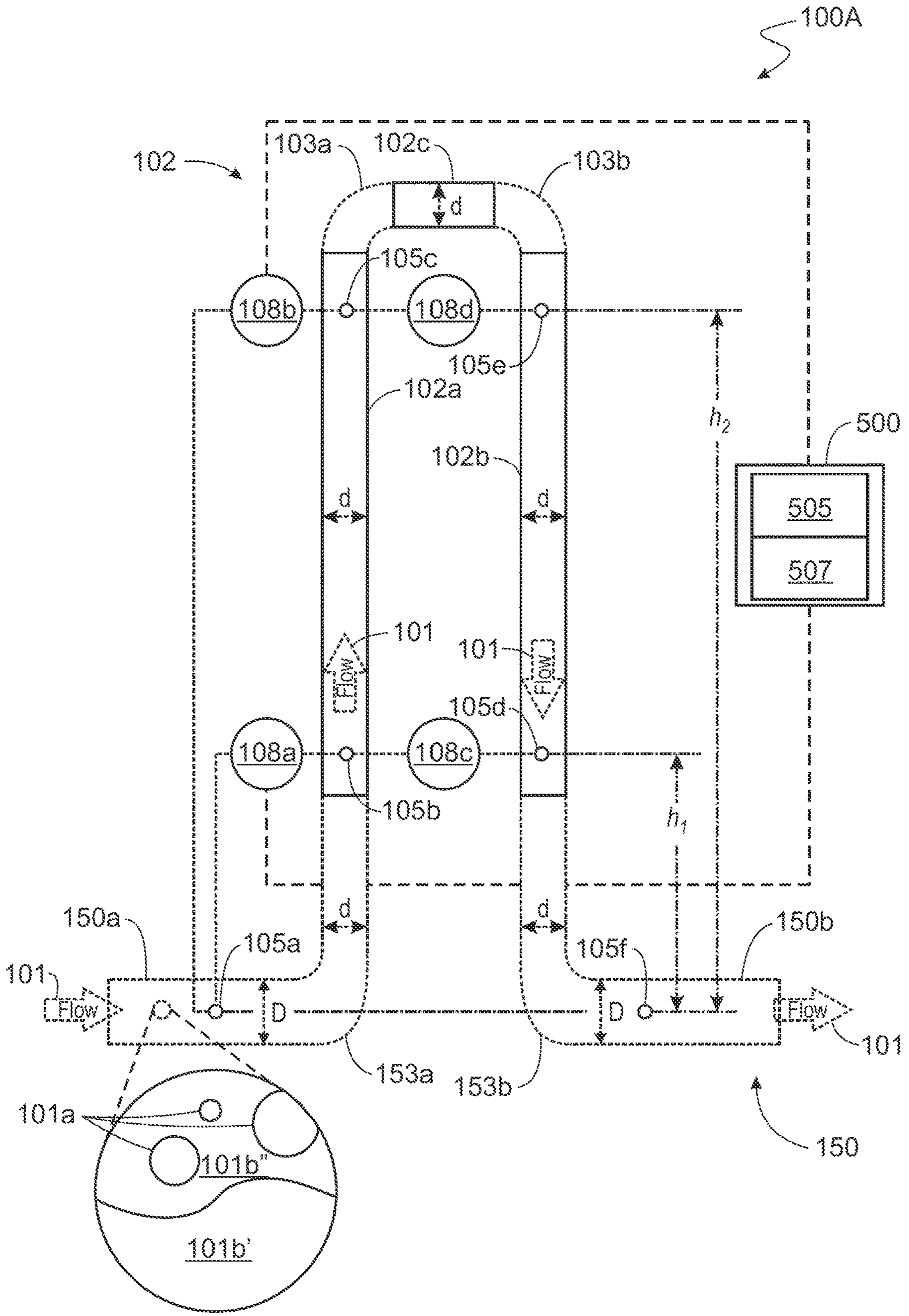
FIG. 1A is a schematic diagram of an example apparatus which can be used to measure density, viscosity, flow rate, and rheological properties of multiphase fluids.

Characterization of the flow of non-Newtonian fluids (for example, during oil-and-gas drilling operations) to determine whether the pumped drilling fluid exhibits intended density and rheological properties can be critical in ensuring success of such operations. Measurements of the non-Newtonian fluids can be used to optimize the rate of penetration of the fluids into the formation, improve drilling efficiency (thereby reducing costs), prevent unintended events (such as accidental loss of control of fluids) with early detection of abnormal/unintended conditions, or any combinations of these. Currently, density and rheology of oilfield fluids are commonly measured by manual sampling, which involves obtaining a fluid sample and measuring a property of the sample using an instrument. For drilling fluid, density is typically measured by manually obtaining and weighing drilling fluid samples a few times per day. Such practice can be subject to human error and fails to provide continuous real-time data. Rheology is typically measured by manual use of a Marsh funnel or a benchtop rheometer a few times per day. Similarly, such practice can be subject to human error and fails to provide continuous real-time data. Drilling fluid flow rate is typically measured by paddle meters, which can be inaccurate. Such measurements (for example, density, rheology, and flow rate) could be more valuable and reliable if performed accurately and continuously in the flowing pipe using inline flowmeters, densitometers, viscometers, and rheometers. Such inline instruments can be installed in a pipe prior to flowing non-Newtonian fluids (such as drilling fluid) into a subterranean formation. Such inline instruments can be installed in a pipe prior to flowing non-Newtonian fluids (such as drilling fluid) out of a subterranean formation. In some cases, particularly for rheology measurements, it can be beneficial to divert a representative portion (for example, a sample) of the non-Newtonian fluid from the main flow pipe to an online instrument (as opposed to an inline instrument) for a more elaborate characterization of the fluid. Conventional online pipe rheometers typically use a pump to flow the sample fluid at various flow rates, a Coriolis meter to measure mass flow rate and fluid density, and a differential pressure sensor to characterize rheological properties.

This disclosure describes a density/rheology meter for multiphase fluids. The density/rheology meter can be used to characterize rheology of Newtonian multiphase fluids and non-Newtonian multiphase fluids. The density/rheology meter can be implemented as part of a multiphase flowmeter (MPFM), a mud (such as drilling fluid) flowmeter/densitometer, a water-cut meter (for example, for gas-free fluids), a viscometer (for example, for Newtonian fluids), and a rheometer (for example, for non-Newtonian fluids). The density/rheology meter includes a U-bend and multiple pressure taps. A first pair of pressure taps span a specified height of a first vertical portion of the U-bend. A second pair of pressure taps span the specified height of a second vertical portion of the U-bend. The first and second vertical portions of the U-bend are substantially the same with respect to flow characteristics (such as dimensions and friction based on material of construction). A third pair of pressure taps span across the U-bend at a first height that is at the same height as one of the first pair of pressure taps. A fourth pair of pressure taps span across the U-bed at a second height that is at the same height as one of the second pair of pressure taps. The pressure drops measured by the first, second, third, and fourth pairs of pressure taps can be compared and manipulated to determine an average (mixture) density, total mass flow rate, friction factor, coefficient of pressure loss, and pressure gradient of the multiphase fluid flowing through the MPFM. Based on these calculated values, water concentration and volumetric phase flow rates of the multiphase fluid can be determined. Further, viscosity and rheology properties of the multiphase fluid can be determined. The apparatuses, systems, and methods described can be implemented to characterize Newtonian fluids and non-Newtonian fluids.

The subject matter described in this disclosure can be implemented in particular implementations, so as to realize one or more of the following advantages. The apparatuses, systems, and methods described can be implemented independent of the use of radioactive energy sources (such as gamma-ray attenuation), which can be hazardous. The apparatuses, systems, and methods described can be implemented to accurately determine the mixture density and flow rate of a multiphase fluid, even in situations in which a gas phase is present in a non-negligible amount. The apparatuses, systems, and methods described can be implemented to accurately determine the mixture density and flow rate of a multiphase fluid, even in complex flow regimes such as slug-flow, plug-flow, and annular flow regimes. The apparatuses, systems, and methods described can be implemented to accurately determine the mixture density and flow rate of a multiphase fluid, even in situations in which there is slip (that is, differential flow velocity) between gas and liquid phases. The apparatuses, systems, and methods described can be implemented to accurately determine the mixture density, flow rate, and viscosity of for a multiphase fluid, for a Newtonian fluid, and for a non-Newtonian fluid. The apparatuses, systems, and methods described can be implemented to accurately determine the mixture density, flow rate, and rheological properties of a non-Newtonian fluid, while taking into account frictional and shear pressure losses. The apparatuses, systems, and methods described can take advantage of pipe geometry (and associated fluid dynamics) to measure a relatively simple (and more direct) flow/fluid property (such as differential pressure), rather than a relatively complex (and more indirect) fluid/flow property (such as electromagnetic (spectral) absorption/transmission) to accurately determine the mixture density, flow rate, and rheological properties of a multiphase fluid. The apparatuses, systems, and methods described can be implemented in conjunction with other flow metering components to supplement and/or enhance the accuracy of the characterization of multiphase fluid flow, Newtonian fluid flow, and non-Newtonian fluid flow. The apparatuses, systems, and methods described can be implemented with field-proven off-the-shelf sensors, thereby allowing for highly reliable and accurate characterization of multiphase fluid flow (Newtonian and non-Newtonian, alike). The apparatuses, systems, and methods described are free of flow obstructions, thereby avoiding failure modes due to erosion and/or breakage. The apparatuses, systems, and methods described can be implemented independent of manual sampling and fluid handling, thereby reducing and/or eliminating the risk of safety hazards and human error. The apparatuses and systems described integrate multiple measurements in a single, compact apparatus/system.

FIG. 1A depicts an apparatus 100A which can be used to measure density, total flow rate, water-cut, viscosity, and rheological properties of a fluid 101 (which can, for example, be a Newtonian fluid or a non-Newtonian fluid). The fluid 101 can be a single-phase, 2-phase, or a 3-phase fluid. For example, the fluid 101 can include a gas phase 101*a* and a liquid phase 101*b*. In some implementations, the liquid phase 101*b* includes an aqueous phase 101*b*' and an oil phase 101*b*". For example, the fluid 101 can include a gas phase 101*a*, an aqueous phase 101*b*', and an oil phase 101*b*". As one example, the fluid 101 can include hydrocarbon gas, hydrocarbon liquid, and water (or brine). As another example, the fluid 101 can include a single-phase Newtonian fluid (such as water or brine), gas (such as nitrogen or natural gas), or alcohol (such as methanol). As another example, the fluid 101 can include a non-Newtonian fluid, such as drilling fluid, hydraulic fracturing fluid, or polymer fluid typically used in oil-and-gas operations.

The apparatus 100A includes a U-bend 102 which is configured to flow the fluid 101. The U-bend 102 includes a first conduit 102*a*, a second conduit 102*b*, and a connecting conduit 102*c*. In some implementations, the second conduit 102*b* is parallel to the first conduit 102*a*. In some implementations, a longitudinal length of the first conduit 102*a* is substantially the same as a longitudinal length of the second conduit 102*b*, and a cross-sectional area of the first conduit 102*a* is substantially the same as a cross-sectional area of the second conduit 102*b*, such that a frictional component of the pressure drop experienced by the fluid 101 flowing through these components (102*a*, 102*b*) of the U-bend 102 is substantially the same for each component. For example, each of the first conduit 102*a* and the second conduit 102*b* have substantially the same inner diameter, d. The connecting conduit 102*c* connects the first conduit 102*a* to the second conduit 102*b*. In some implementations, the first conduit 102*a*, the second conduit 102*b*, and the connecting conduit 102*c* are integrated, such that the U-bend 102 is a singular, unitary body, as opposed to parts that are disjointed and coupled together to form the U-bend 102. In some implementations, the connecting conduit 102*c* is perpendicular to the first conduit 102*a* and to the second conduit 102*b*. The fluid 101 flowing through the U-bend 102 flows into the first conduit 102*a*, through the connecting conduit 102*c*, and out of the second conduit 102*b*. In some implementations, each of the first conduit 102*a*, the second conduit 102*b*, and the connecting conduit 102*c* are made of the same material, such that the friction experienced by the fluid 101 flowing through each of the first conduit 102*a*, the second conduit 102*b*, and the connecting conduit 102*c* is substantially the same. In some implementations, the connecting conduit 102*b* is connected to the first conduit 102*a* by a first curved bend 103*a*. In some implementations, the connecting conduit 102*c* is connected to the second conduit 102*b* by a second curved bend 103*b*. In some implementations, the first conduit 102*a*, the second conduit 102*b*, the connecting conduit 102*c*, the first curved bend 103*a*, and the second curved bend 103*b* are integrated, such that the U-bend 102 is a singular, unitary body, as opposed to parts that are disjointed and coupled together to form the U-bend 102. The first curved bend 103*a* and the second curved bend 103*b* can be made of the same material as the first conduit 102*a*, the second conduit 102*b*, and the connecting conduit 102*c*, such that the friction experienced by the fluid 101 flowing through each of the components of the U-bend 102 is substantially the same.

As shown in FIG. 1A, the U-bend 102 can be connected to a flow pipe 150 that flows the fluid 101. The flow pipe 150 includes a first pipe 150*a* and a second pipe 150*b*. The terms "pipe" and "conduit" are synonymous. The term "pipe" is being used in relation to the flow pipe 150 and the term "conduit" is being used in relation to the U-bend 102 simply for consistency/clarity and to avoid confusion. In some implementations, the U-bend 102 is connected to the flow pipe 150 by curved bends 153*a*, 153*b*. For example, the first conduit 102*a* of the U-bend 102 is connected to the first pipe 150*a* of the flow pipe 150 by the first curved bend 153*a*. For example, the second conduit 102*b* of the U-bend 102 is connected to the second pipe 150*b* of the flow pipe 150 by the second curved bend 153*b*. In some implementations, as shown in FIG. 1A, the curved bends 153*a*, 153*b* are 90-degree curved bends. Although shown as 90-degree curved bends in FIG. 1A, the curved bends 153*a*, 153*b* can have a different degree angle, such as in a range of from 30 degrees to 150 degrees. In some implementations, the first conduit 102*a*, the second conduit 102*b*, the connecting conduit 102*c*, the first curved bend 103*a*, the second curved bend 103*b*, the first curved bend 153*a*, the second curved bend 153*b*, and the flow pipe 150 are integrated, such that the U-bend 102 and the flow pipe 150 form a singular, unitary body, as opposed to parts that are disjointed and coupled together. In some implementations, the curved bends 153*a*, 153*b* are replaced by angled bends. In some implementations, the curved bends 153*a*, 153*b* are replaced by blind-tees that have sharp 90-degree bends.

In some implementations, the inner diameters (d) of the first conduit 102*a* and the second conduit 102*b* are different from the inner diameter (D) of the flow pipe 150. A change in cross-sectional flow area between the flow pipe 150 and the U-bend 102 can ensure that the differential pressures of the fluid 101 flowing across the angled bends 153*a*, 153*b* are predominantly functions of the total flow rate of the fluid 101 as opposed to other factors, such as frictional pressure losses. In some implementations, the inner diameters (d) of the first conduit 102*a* and the second conduit 102*b* can be in a range of from a third of the inner diameter (D) of the flow pipe 150 to double the inner diameter (2D) of the flow pipe 150 (that is, $D/3 \leq d \leq 2D$).

The apparatus 100A includes a first differential pressure sensor 108*a* coupled to the first pipe 150*a* via pressure port 105*a* and the first conduit 102*a* via pressure port 105*b*. The first differential pressure sensor 108*a* is configured to measure a first differential pressure of the fluid 101 flowing through the apparatus 100A. The pressure ports 105*a* and 105*b* are separated by a first specified differential pressure height, $h_1$, with respect to gravity. The apparatus 100A includes a second differential pressure sensor 108*b* coupled to the first pipe 150*a* via pressure port 105*a* and the first conduit 102*a* via pressure port 105*c*. The second differential pressure sensor 108*b* is configured to measure a second differential pressure of the fluid 101 flowing through the apparatus 100A. The pressure ports 105*a* and 105*c* are separated by a second specified differential pressure height, $h_2$, with respect to gravity. The apparatus 100A includes a third differential pressure sensor 108*c* coupled to the first conduit 102*a* via pressure port 105*b* and the second conduit 102*b* via pressure port 105*d*. The third differential pressure sensor 108*c* is configured to measure a third differential pressure of the fluid 101 flowing through the apparatus 100A. The pressure ports 105*b* and 105*d* are at the first specified differential pressure height, $h_1$, with respect to gravity. As such, there is no difference in vertical height between the pressure ports 105*b* and 105*d* with respect to gravity. Further, the pressure ports 105*b* and 105*d* are each separated by the first specified differential pressure height, $h_1$, in relation to pressure port 105*a*. The apparatus 100A includes a fourth differential pressure sensor 108*d* coupled to the first conduit 102*a* via pressure port 105*c* and the second conduit 102*b* via pressure port 105*e*. The fourth differential pressure sensor 108*d* is configured to measure a fourth differential pressure of the fluid 101 flowing through the apparatus 100A. The pressure ports 105*c* and 105*e* are at the second specified differential pressure height, $h_2$, with respect to gravity. As such, there is no difference in vertical height between the pressure ports 105*c* and 105*e* with respect to gravity. Further, the pressure ports 105*c* and 105*c* are each separated by the second specified differential pressure height, $h_2$, in relation to pressure port 105*a*.

In some implementations, each of the differential pressure sensors (108*a*, 108*b*, 108*c*, 108*d*) are at least a threshold distance away from the closest bend. The threshold distance is long enough to allow the flow of the fluid 101 to fully develop after the disturbance in flow caused by an upstream bend or long enough to allow the flow of the fluid 101 to remain fully developed before approaching a downstream bend. Without being bound to theory, the method of sensing (for example, the application and/or objective of the measurement) can determine the location at which the sensors should be placed. For the apparatuses and methods described here, the threshold distance can be, for example, four times the inner diameter, d (that is, 4d). For example, if the inner diameter (d) of the U-bend 102 is 1 inch, the threshold distance is 4 inches. For example, the pressure port 105*a*, to which the differential pressure sensors 108*a* and 108*b* are coupled, is located on the first pipe 150*a* at least 4D distance away from the curved bend 153*a*. For example, the pressure port 105*b*, to which the differential pressure sensors 108*a* and 108*c* are coupled, is located on the first conduit 102*a* at least 4d distance away from the curved bend 153*a*. For example, the pressure port 105*c*, to which the differential pressure sensors 108*b* and 108*d* are coupled, is located on the first conduit 102*a* at least 4d distance away from the curved bend 103*a*. For example, the pressure port 105*d*, to which the differential pressure sensor 108*c* is coupled, is located on the second conduit 102*b* at least 4d distance away from the curved bend 153*b*.

Figure 6:
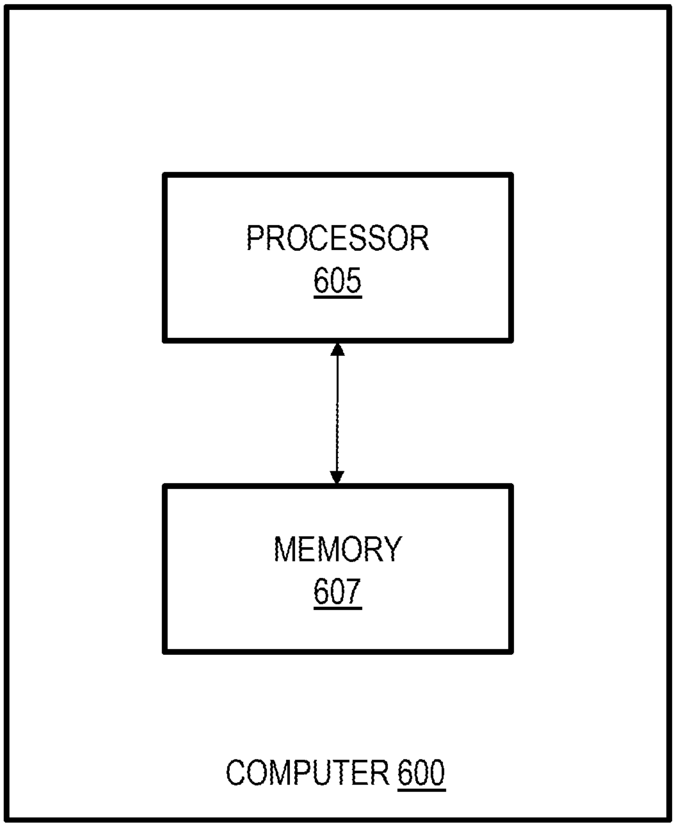
FIG. 6 is a block diagram of an example computer system.

As shown in FIG. 1A, the apparatus 100A can be communicatively coupled to a computer 600. The computer 600 includes a processor 605 and a memory 607. The processor 605 can be communicatively coupled to the first differential pressure sensor 108*a*, the second differential pressure sensor 108*b*, the third differential pressure sensor 108*c*, and the fourth differential pressure sensor 108*d*. The memory 607 is coupled to the processor 605. The computer 600 is also shown in FIG. 6 and is described in more detail later. The memory 607 stores programming instructions for execution by the processor 605. The programming instructions can instruct the processor 605 to perform various operations. The operations performed by the processor 605 can include receiving a first differential pressure signal from the first differential pressure sensor 108*a*. The first differential pressure signal can represent the first differential pressure of the fluid 101 measured by the first differential pressure sensor 108*a*. The operations performed by the processor 605 can include receiving a second differential pressure signal from the second differential pressure sensor 108*b*. The second differential pressure signal can represent the second differential pressure of the fluid 101 measured by the second differential pressure sensor 108*b*. The operations performed by the processor 605 can include receiving a third differential pressure signal from the third differential pressure sensor 108*c*. The third differential pressure signal can represent the third differential pressure of the fluid 101 measured by the third differential pressure sensor 108*c*. The operations performed by the processor 605 can include receiving a fourth differential pressure signal from the fourth differential pressure sensor 108*d*. The fourth differential pressure signal can represent the fourth differential pressure of the fluid 101 measured by the fourth differential pressure sensor 108*d*. The operations performed by the processor 605 can include determining a mixture density of the fluid 101 at least based on a difference between the first differential pressure and the second differential pressure of the fluid 101, a difference between the third differential pressure and the fourth differential pressure of the fluid 101, the first specified differential pressure height, $h_1$, and the second specified differential pressure height, $h_2$. The operations performed by the processor 605 can include determining a total flow rate of the fluid 101 at least based on the first differential pressure, the mixture density of the fluid 101, and the first specified differential pressure height, $h_1$. The operations performed by the processor 605 can include determining a friction factor of the fluid 101 at least based on a difference between the third differential pressure and the fourth differential pressure of the fluid, the mixture density of the fluid 101, and the total flow rate of the fluid 101. The operations performed by the processor 605 can include determining a pressure gradient of the fluid 101 at least based on the third differential pressure of the fluid 101, the fourth differential pressure of the fluid 101, the first specified differential pressure height, $h_1$, and the second specified differential pressure height, $h_2$.

Using basic principles of fluid dynamics (for example, the Bernoulli principle and the Darcy-Weisbach equation), the differential pressure between any two pressure ports can be primarily attributed to the change in cross-sectional flow area between the respective pressure ports, difference in vertical height between the respective pressure ports, friction (both between the fluid 101 and the inner wall of the flow path and between various components of the fluid 101) along the flow path between the respective pressure ports, and change in flow direction (for example, through bends/elbows, such as the curved bend 153*a*). The first differential pressure measured by the first differential pressure sensor 108*a* is primarily affected by the total flow rate of the fluid. The difference between the second differential pressure measured by the second differential pressure sensor 108*b* and the first differential pressure measured by the first differential pressure sensor 108*a* is primarily affected by the mixture density of the fluid 101 in the vertical column of the first conduit 102*a*. The difference between the fourth differential pressure measured by the fourth differential pressure sensor 108*d* and the third differential pressure measured by the third differential pressure sensor 108*c* is primarily affected by frictional pressure losses of the fluid 101.

Table 1 provides an example breakdown of the components of pressure loss that can contribute to the overall differential pressures measured by the differential pressure sensors 108*a*, 108*b*, 108*c*, 108*d*. The numbers in parentheses shown in Table 1 correspond to the respective equation numbers for later referencing. $\Delta P_1$ is the first differential pressure measured by the first differential pressure sensor 108*a*; $\Delta P_2$ is the second differential pressure measured by the second differential pressure sensor 108*b*; $\Delta P_3$ is the third differential pressure measured by the third differential pressure sensor 108*c*; $\Delta P_4$ is the fourth differential pressure measured by the fourth differential pressure sensor 108*d*; ρ is the mixture density of the fluid 101; g is acceleration due to gravity; $h_1$ is the first vertical height; $h_2$ is the second vertical height; $\dot{m}$ is the total flow rate of the fluid 101; f is friction factor (nominally for the two vertical sections of the apparatus 100A (conduits 102*a*, 102*b*)); and b is coefficient of pressure loss due to the change in flow direction (in the curved bend 153*a*).

TABLE 1

Differential pressure breakdown for apparatus 100A

| | Pressure loss due to height change | Pressure loss due to cross-sectional flow area change |
|---|---|---|
| $\Delta P_1$ | $\rho \times g \times h_1$ (1) | $\frac{\dot{m}^2}{\rho \times G_1^2}$ (3) |
| $\Delta P_2$ | $\rho \times g \times h_2$ (2) | $\frac{\dot{m}^2}{\rho \times G_1^2}$ (3) |
| $\Delta P_3$ | 0 | 0 |
| $\Delta P_4$ | 0 | 0 |
| | **Pressure loss due to friction** | **Pressure loss due to change in flow direction** |
| $\Delta P_1$ | | $\frac{\dot{m}^2}{\rho \times G_1^2} \times b$ (4) |
| $\Delta P_2$ | $\frac{\Delta P_3 - \Delta P_4}{2}$ (5) | $\frac{\dot{m}^2}{\rho \times G_1^2} \times b$ (4) |
| $\Delta P_3$ | $\frac{\dot{m}^2}{\rho} \times f \times G_2 + \Delta P_4$ (6) | |
| $\Delta P_4$ | $\Delta P_4$ | |

$G_1$ is a factor that accounts for the change in cross-sectional flow area and is calculated by Equation 7:

$$G_1 = \frac{\pi \times D^2 \times d^2}{\sqrt{8 \times (D^4 - d^4)}}, \quad (7)$$

$G_2$ is a factor that accounts for the change flow direction across the curved bends 103*a*, 103*b* and is calculated by Equation 8:

$$G_2 = \frac{h_2 \times h_1}{\left(\frac{\pi \times d^2}{4}\right)^2 \times D} \quad (8)$$

By manipulating the equations shown in Table 1, the following equations can be used to calculating mixture density (ρ) of the fluid 101, total flow rate ($\dot{m}$) of the fluid 101, friction factor (f), and coefficient of pressure loss (b):

$$\rho = \frac{(\Delta P_2 - \Delta P_1) - \frac{\Delta P_3 - \Delta P_4}{2}}{g \times (h_2 - h_1)} \quad (9)$$

$$\dot{m} = C_d \times G_1 \times \sqrt{\rho \times (\Delta P_1 - \rho \times g \times h_1)} \quad (10)$$

-continued $$f = \frac{\Delta P_3 - \Delta P_4}{\left(\frac{\dot{m}^2}{\rho}\right) \times G_2} \quad (11)$$

$$b = \frac{1}{C_d^2} - 1 \quad (12)$$

where $C_d$ is a discharge coefficient, which can be determined empirically (for example, based on historical data or correcting with real-time data) and is akin to the discharge coefficient of Venturi-type flow devices. Further, the pressure gradient of the fluid 101 flowing through the apparatus 100A can be determined by Equation 13:

$$\nabla P = \frac{\Delta P_3 - \Delta P_4}{2 \times (h_2 - h_1)} \quad (13)$$

where ∇P is the pressure gradient along the flow path (or pipe length).

Thus, the mixture density (ρ) and the total flow rate ($\dot{m}$) of the fluid 101 flowing through the apparatus 100A can be determined based on the differential pressure measurements taken by the differential pressure sensors (108*a*, 108*b*, 108*c*, 108*d*) and relative positions of the differential pressure sensors (108*a*, 108*b*, 108*c*, 108*d*), which take into account the heights $h_1$, $h_2$. The following assumptions can be applied in implementing the equations above (1-13) for calculations: mixture density is assumed to be constant through the apparatus 100A due to relatively small pressure losses in pipe sections between bends; frictional and/or shear losses in the two vertical sections (conduits 102*a*, 102*b*) are assumed equal due to similar flow velocities, fluid properties, and flow-regimes in the two vertical sections; and flow through the apparatus 100A is assumed to be statistically stationary over a sufficiently long duration (for example, over a time duration in a range of from about 1 second to about 10 seconds), such that each average differential pressure is constant during that duration.

In some implementations, the differential pressure sensors (108*a*, 108*b*, 108*c*, 108*d*) measure differential pressures of the fluid 101 flowing through the apparatus 100A multiple times across a time duration. Each of the first differential pressures, each of the second differential pressures, each of the third differential pressures, and each of the fourth differential pressures measured by the first differential pressure sensor 108*a*, the second differential pressure sensor 108*b*, the third differential pressure sensor 108*c*, and the fourth differential pressure sensor 108*d*, respectively, can be correlated to time points at which they were measured. Each of the first differential pressures, each of the second differential pressures, each of the third differential pressures, and each of the fourth differential pressures measured by the first differential pressure sensor 108*a*, the second differential pressure sensor 108*b*, the third differential pressure sensor 108*c*, and the fourth differential pressure sensor 108*d*, respectively, can take account for the time delay of the fluid 101 taking time to travel through the apparatus 100A. For example, the measured differential pressures can be time-corrected to account for the delay in the fluid 101 traveling through the apparatus 100A. The time-series data can, for example, be stored in the memory 607. The time-series data can, for example, be used to train and/or build a neural network-based classification model, which can be used to accurately identify flow regimes (for example, bubble flow, mist flow, slug flow, churn flow, annular flow, stratified flow, or intermittent flow). For example, the time-series data can be converted into a spectrogram (for example, by using a Morlet wavelet transform), and a single-layer two-dimensional image can be compiled from the spectrogram. A neural network (machine learning model) can then analyze the image and identify the flow regime of the fluid 101 flowing through the apparatus 100A, for example, based on comparison to historical data. The time-series data can, for example, be used to train and/or build a neural network-based classification model, which can be used to estimate bulk flow velocity of the fluid 101 flowing through the apparatus 100A. For example, the time-series data can be converted into a spectrogram (for example, by using a Morlet wavelet transform), and a single-layer two-dimensional image can be compiled from the spectrogram. A neural network (machine learning model) can then analyze the image and estimate the bulk flow velocity and/or flow rate of the fluid 101 flowing through the apparatus 100A, for example, based on comparison to historical data.

Figure 1B:
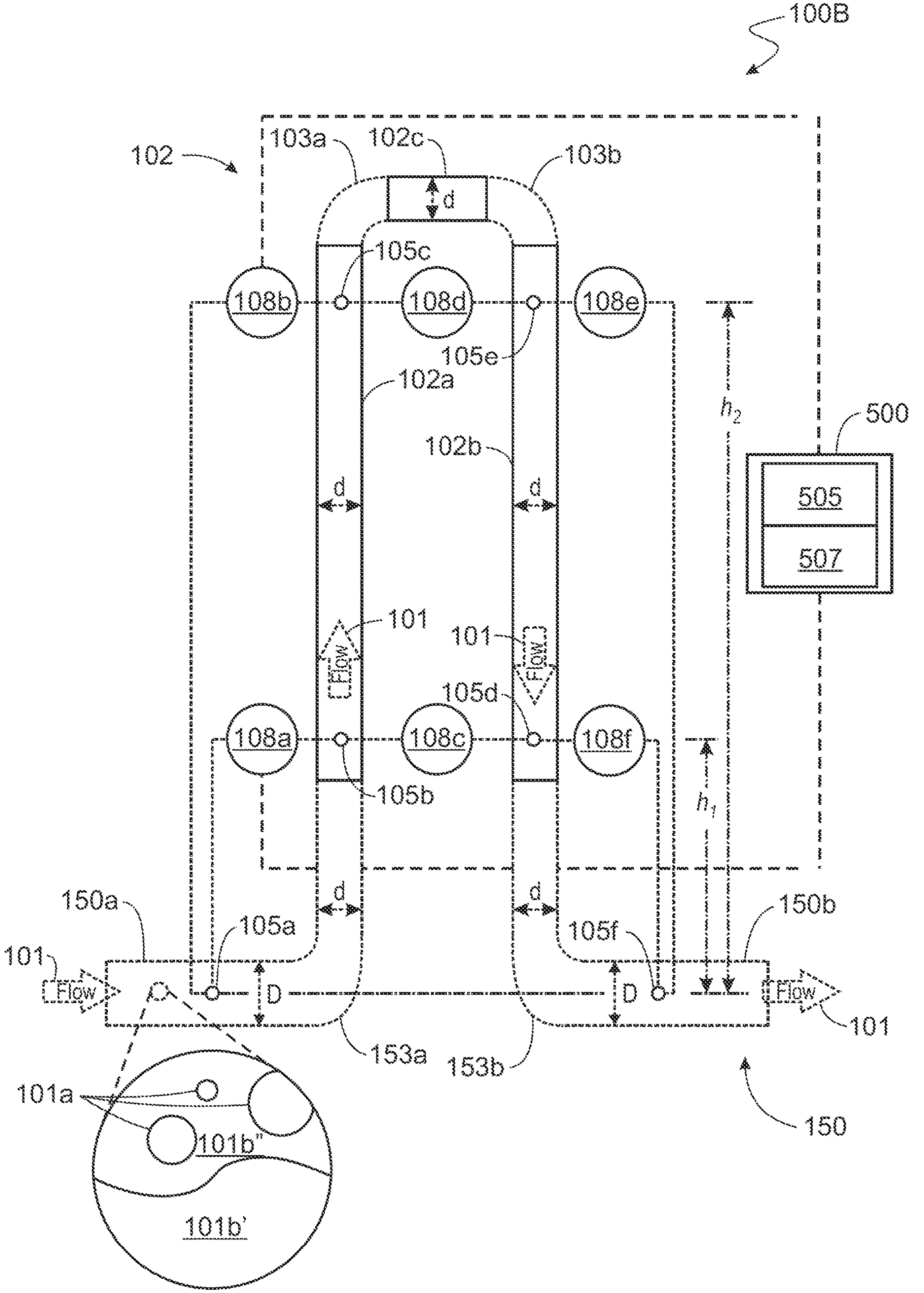
FIG. 1B is a schematic diagram of an example apparatus which can be used to measure density, viscosity, flow rate, and rheological properties of multiphase fluids.

FIG. 1B depicts an apparatus 100B which can be used to measure a density and total flow rate of a fluid 101. The apparatus 100B can be substantially similar to the apparatus 100A shown in FIG. 1A. In comparison, the apparatus 100B includes two additional differential pressure sensors 108*e* and 108*f*. The fifth differential pressure sensor 108*e* is coupled to the second conduit 102*b* via pressure port 105*e* and the second pipe 150*b* via pressure port 105*f*. The fifth differential pressure sensor 108*e* is configured to measure a fifth differential pressure of the fluid 101 flowing through the apparatus 100B. The pressure ports 105*e* and 105*f* are separated by the second specified differential pressure height, $h_2$, with respect to gravity. The sixth differential pressure sensor 108*b* coupled to the second conduit 102*b* via pressure port 105*d* and the second pipe 150*b* via pressure port 105*f*. The sixth differential pressure sensor 108*f* is configured to measure a sixth differential pressure of the fluid 101 flowing through the apparatus 100B. The pressure ports 105*d* and 105*f* are separated by the first specified differential pressure height, $h_1$, with respect to gravity.

The height difference ($h_1$) between the pressure ports 105*a*, 105*b* of the first differential pressure sensor 108*a* and the height difference between the pressure ports 105*d*, 105*f* of the sixth differential pressure sensor 108*e* are the same, such that the frictional components of the pressure drops experienced by the fluid 101 flowing through the apparatus 100B between pressure ports 105*a*, 105*b* are substantially the same as the frictional components of the pressure drops experienced by the fluid 101 flowing through the apparatus 100B between pressure ports 105*d*, 105*f*. Similarly, the height difference ($h_2$) between the pressure ports 105*a*, 105*c* of the second differential pressure sensor 108*b* and the height difference between the pressure ports 105*e*, 105*f* of the fifth differential pressure sensor 108*e* are the same, such that the frictional components of the pressure drops experienced by the fluid 101 flowing through the apparatus 100B between pressure ports 105*a*, 105*c* are substantially the same as the frictional components of the pressure drops experienced by the fluid 101 flowing through the apparatus 100B between pressure ports 105*c*, 105*f*.

Table 2 provides an example breakdown of the components of pressure loss that can contribute to the overall differential pressures measured by the differential pressure sensors 108*a*, 108*b*, 108*c*, 108*d*, 108*c*, and 108*f* for apparatus 100B. The numbers in parentheses shown in Table 2 correspond to the respective equation numbers for later referencing. $\Delta P_1$ is the first differential pressure measured by the first differential pressure sensor 108*a*; $\Delta P_2$ is the second differential pressure measured by the second differential pressure sensor 108*b*; $\Delta P_3$ is the third differential pressure measured by the third differential pressure sensor 108*c*; $\Delta P_4$ is the fourth differential pressure measured by the fourth differential pressure sensor 108*d*; $\rho_1$ is the mixture density of the fluid 101 for the upflow section of apparatus 100B; $\rho_2$ is the mixture density of the fluid 101 for the downflow section of apparatus 100B; g is acceleration due to gravity; $h_1$ is the first vertical height; $h_2$ is the second vertical height; $\dot{m}$ is the total flow rate of the fluid 101; f is friction factor (nominally for the two vertical sections of the apparatus 100B (conduits 102*a*, 102*b*)); $b_1$ is coefficient of pressure loss due to the change in flow direction (in the curved bend 153*a*) for the upflow section of apparatus 100B; and $b_2$ is coefficient of pressure loss due to the change in flow direction (in the curved bend 153*a*) for the downflow section of apparatus 100B. The mixture density ($\rho$) of the fluid 101 can be calculated as the average of $\rho_1$ and $\rho_2$. The mixture density of the fluid 101 for the upflow section of apparatus 100B ($\rho_1$) can be calculated by Equation 9. The mixture density of the fluid 101 for the downflow section of apparatus 100B ($\rho_2$) can be calculated by Equation 9':

$$\rho_2 = \frac{(\Delta P_5 - \Delta P_6) - \frac{\Delta P_3 - \Delta P_4}{2}}{g \times (h_2 - h_1)} \tag{9'}$$

TABLE 2

Differential pressure breakdown for apparatus 100B

| | Pressure loss due to height change | Pressure loss due to cross-sectional flow area change |
|---|---|---|
| $\Delta P_1$ | $\rho_1 \times g \times h_1$ (1') | $\frac{\dot{m}^2}{\rho \times G_1^2}$ (3′) |
| $\Delta P_2$ | $\rho_1 \times g \times h_2$ (2') | $\frac{\dot{m}^2}{\rho \times G_1^2}$ (3′) |
| $\Delta P_3$ | 0 | 0 |
| $\Delta P_4$ | 0 | 0 |
| $\Delta P_5$ | $\rho_2 \times g \times h_2$ (14) | $\frac{\dot{m}^2}{\rho_2 \times G_1^2}$ (16) |
| $\Delta P_6$ | $\rho_2 \times g \times h_1$ (15) | $\frac{\dot{m}^2}{\rho \times G_1^2}$ (16) |
| | **Pressure loss due to friction** | **Pressure loss due to change in flow direction** |
| $\Delta P_1$ | $\frac{\dot{m}^2}{\rho \times G_1^2} \times b_1$ (4′) | |
| $\Delta P_2$ | $\frac{\Delta P_3 - \Delta P_4}{2}$ (5) | $\frac{\dot{m}^2}{\rho \times G_1^2} \times b_1$ (4′) |
| $\Delta P_3$ | $\frac{\dot{m}^2}{\frac{\rho_1 + \rho_2}{2}} \times f \times G_2 + \Delta P_4$ (6′) | |
| $\Delta P_4$ | $\Delta P_4$ | |

TABLE 2-continued

| Differential pressure breakdown for apparatus 100B | | |
|---|---|---|
| $\Delta P_5$ | $\frac{\Delta P_3 - \Delta P_4}{2}$ (5) | $\frac{\dot{m}^2}{\rho_2 \times G_1^2} \times b_2$ (17) |
| $\Delta P_6$ | $\frac{\dot{m}^2}{\rho_2 \times G_1^2} \times b_2$ (17) | |

Figure 1C:
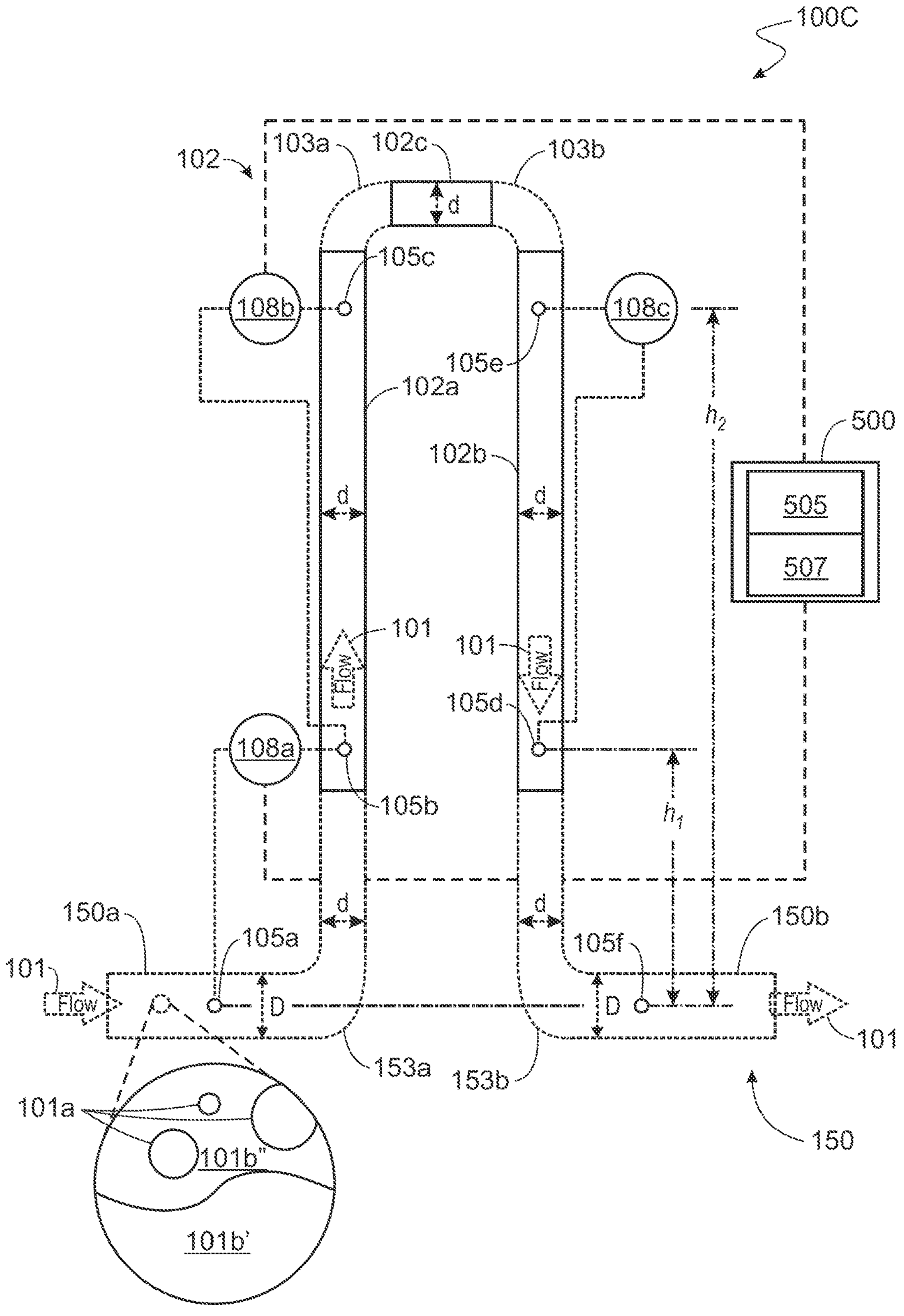
FIG. 1C is a schematic diagram of an example apparatus which can be used to measure density, viscosity, flow rate, and rheological properties of multiphase fluids.

FIG. 1C depicts an apparatus 100C which can be used to measure a density and total flow rate of a fluid 101. The apparatus 100C can be substantially similar to the apparatus 100A shown in FIG. 1A. In comparison, the second differential pressure sensor 108*b* is instead coupled to the first conduit 102*a* via pressure ports 105*b* and 105*c*, the third differential pressure sensor 108*c* is instead coupled to the second conduit 102*b* via pressure ports 105*d* and 105*e*, and the fourth differential pressure sensor 108*d* is omitted. As mentioned previously, the pressure ports 105*b* and 105*c*, as well as pressure ports 105*d* and 105*e* are separated by the second specified differential pressure height, $h_2$-$h_1$, with respect to gravity.

Table 3 provides an example breakdown of the components of pressure loss that can contribute to the overall differential pressures measured by the differential pressure sensors 108*a*, 108*b*, and 108*c* for apparatus 100C. The numbers in parentheses shown in Table 2 correspond to the respective equation numbers for later referencing. $\Delta P_1$ is the first differential pressure measured by the first differential pressure sensor 108*a*; $\Delta P_2$ is the second differential pressure measured by the second differential pressure sensor 108*b*; $\Delta P_3$ is the third differential pressure measured by the third differential pressure sensor 108*c*; ρ is the mixture density of the fluid 101; g is acceleration due to gravity; $h_1$ is the first vertical height; $h_2$ is the second vertical height; $\dot{m}$ is the total flow rate of the fluid 101; f is friction factor (nominally for the two vertical sections of the apparatus 100C (conduits 102*a*, 102*b*)); b is coefficient of pressure loss due to the change in flow direction (in the curved bend 153*a*).

$$\rho = \frac{\Delta P_2 - \Delta P_3}{2 \times g \times (h_2 - h_1)} \quad (9'')$$

TABLE 3

| Differential pressure breakdown for apparatus 100C | | |
|---|---|---|
| | Pressure loss due to height change | Pressure loss due to cross-sectional flow area change |
| $\Delta P_1$ | $\rho \times g \times h_1$ (1) | $\frac{\dot{m}^2}{\rho \times G_1^2}$ (3) |
| $\Delta P_2$ | $\rho \times g \times (h_2 - h_1)$ (2') | 0 |
| $\Delta P_3$ | $\rho \times g \times (h_1 - h_2)$ (2") | 0 |
| | Pressure loss due to friction | Pressure loss due to change in flow direction |
| $\Delta P_1$ | $\frac{\dot{m}^2}{\rho \times G_1^2} \times b_1$ (4) | |

TABLE 3-continued

| Differential pressure breakdown for apparatus 100C | | |
|---|---|---|
| $\Delta P_2$ | $\frac{\dot{m}^2}{2\rho} \times f \times G_2$ (18) | 0 |
| $\Delta P_3$ | $\frac{\dot{m}^2}{2\rho} \times f \times G_2$ (18) | 0 |

Any of the apparatuses 100A, 100B, or 100C can be implemented as an online instrument, which analyzes a slip stream flowing a representative sample of a fluid, such as the fluid 101. For simplicity and clarity, the following description in this paragraph for online instrument implementation is described in relation to apparatus 100A, but the concepts can also be applied for apparatuses 100B and 100C. For online instrument implementation, a slip stream branches from a main flowline flowing the fluid 101. The slip stream includes a representative sample of the fluid 101 which is analyzed by apparatus 100A. A pump flows the slip stream into the first conduit 150*a* (having inner diameter, D) of the apparatus 100A. The pump is configured to flow the slip stream at various setpoint flow rates, such that the apparatus 100A can analyze the slip stream at different flow rates for accurately determining rheology of the fluid 101. The setpoints (i) are integer numbers from 1 to n, where n is the final set point. For example, for three setpoints, n is 3, i is 1 for the first setpoint, i is 2 for the second setpoint, and i is 3 for the third and final setpoint. As another example, for five setpoints, n is 5, i is 1 for the first setpoint, i is 2 for the second setpoint, i is 3 for the third setpoint, i is 4 for the fourth setpoint, and i is 5 for the fifth and final setpoint. Although examples for n=3 and n=5 have been provided, the online instrument implementations can include fewer (for example, one or two) or additional (for example, four, six, or more than six) setpoints. For each setpoint (i), the apparatus 100A measures a total mass flowrate ($\dot{m}_i$), a fluid mixture density ($\rho_i$), and a pressure gradient ($(\Delta P/\Delta L)_i$) of the slip stream (the subscript i designates the measurement made for that respective setpoint). The apparatus 100A measures various pressures (for example, pressure readings and/or differential pressure readings) and temperatures and uses such readings as inputs for calculating the total mass flowrate ($\dot{m}_i$), the fluid mixture density ($\rho_i$), and the pressure gradient ($(\Delta P/\Delta L)_i$) of the slip stream for each setpoint, i. The apparatus 100A can determine additional properties of the fluid 101, such as bulk flow velocity (V), wall shear stress ($\tau_w$), wall shear rate ($\dot{\gamma}_w$), plastic viscosity ($\mu_p$), apparent (equivalent) viscosity ($\mu_e$), Reynolds number (Re), and friction factor (f). Further, the apparatus 100A can manipulate the determined properties of the fluid 101 to generate data plots, along with curve-fitting models to further characterize rheology of the fluid 101. The computer 600 can, for example, perform operations such as calculating any combinations of the Equations 1-24, plotting, and generating curve-fitting models. Bulk flow velocity (V) can, for example, be calculated by Equation 19:

$$V_i = \frac{4\dot{m}_i}{\rho_i \pi D^2}, \quad i = 1, \ldots, n \quad (19)$$

Wall shear stress ($\tau_w$) can, for example, be calculated by Equation 20:

$$\tau_{w,i} = \frac{D}{4}\left(\frac{\Delta P}{\Delta L}\right)_i, \quad i = 1, \ldots, n \tag{20}$$

Wall shear rate ($\dot{\gamma}_w$) can, for example, be calculated by Equation 21:

$$\dot{\gamma}_{w,i} = \left(\frac{3N_i + 1}{4N_i}\right)\frac{8V_i}{D}, \quad i = 1, \ldots, n \tag{21}$$

where $N_i$ is a generalized flow behavior index that is equal to the slope of a curve-fitting model (typically a second order polynomial) of a plot of the logarithm of wall shear stress ($\tau_{w,i}$) versus the logarithm of $8\times V_i/D$. The values for wall shear stress ($\tau_{w,i}$) and wall shear rate ($\dot{\gamma}_{w,i}$) can be plotted as a rheogram, and a curve-fitting model (for example, a Herschel-Bulkley model: $\tau_w=\tau_y+K\times\dot{\gamma}^n$) can be generated to determine rheological constants, such as yield-point stress ($\tau_y$), consistency index/factor (K), and flow behavior index (n). For Newtonian fluids, for example, n=1, $\tau_y$=0, and K=viscosity. Plastic viscosity ($\mu_p$) can, for example, be determined by the slope of the rheogram. Apparent (equivalent) viscosity ($\mu_e$) can, for example, be calculated by Equation 22:

$$\mu_e = \frac{\tau_w}{\dot{\gamma}} \tag{22}$$

Reynolds number (Re) can, for example, be calculated by Equation 23:

$$Re_i = \frac{\rho_i V_i D}{\mu_{e,i}} \times \frac{4n}{n+1}, \quad i = 1, \ldots, n \tag{23}$$

Friction factor (f) can, for example, be calculated by Equation 24:

$$f_i = \frac{D}{4} \times \left(\frac{\Delta P}{\Delta L}\right)_i \times \frac{1}{\frac{\rho_i V_i^2}{2}}, \quad i = 1, \ldots, n \tag{24}$$

A plot of friction factor (f) versus Reynolds number (Re) can be plotted, and a curve-fitting model can be generated. The "critical" Reynolds number can be the sudden change in the curve-fitting model.

Any of the apparatuses 100A, 100B, or 100C can be implemented as an inline instrument, which directly analyzes the fluid (such as the fluid 101) flowing in the main flow line, such as a drilling or hydraulic fracturing fluid flowing into a subterranean formation via a main injection line or flowing out of the subterranean formation via a main return line. In contrast to the online instrument implementation, the inline instrument implementation analyzes the fluid 101 as a whole (as opposed to analyzing only a representative sample (slip stream), as does the online instrument implementation). For simplicity and clarity, the following description in this paragraph for inline instrument implementation is described in relation to apparatus 100A, but the concepts can also be applied for apparatuses 100B and 100C. The fluid 101 flows into the first conduit 150*a* (having inner diameter, D) of the apparatus 100A. Similarly as in online instrument implementations, in inline instrument implementations, the apparatus 100A measures a total mass flowrate ($\dot{m}$), a fluid mixture density ($\rho$), and a pressure gradient ($\Delta P/\Delta L$) of the fluid 101. The apparatus 100A measures various pressures (for example, pressure readings and/or differential pressure readings) and temperatures and uses such readings as inputs for calculating the total mass flowrate ($\dot{m}$), a fluid mixture density ($\rho$), and a pressure gradient ($\Delta P/\Delta L$) of the fluid 101. The apparatus 100A can determine additional properties of the fluid 101, such as bulk flow velocity (V), shear rate ($\dot{\gamma}$), shear stress ($\tau_w$), apparent (equivalent) viscosity ($\mu_e$), Reynolds number (Re), and friction factor (f). Further, the apparatus 100A can manipulate the determined properties of the fluid 101 to generate data plots, along with curve-fitting models to further characterize rheology of the fluid 101. The computer 600 can, for example, perform operations such as calculating any combinations of the Equations 1-24, plotting, and generating curve-fitting models. Bulk flow velocity (V) can, for example, be calculated by Equation 25:

$$V = \frac{4\dot{m}}{\rho\pi D^2} \tag{25}$$

A generalized flow behavior index (N) can be determined from a curve-fitting model of a plot of the logarithm of $8\times V/D$. Shear rate ($\dot{\gamma}$) can, for example, be calculated by Equation 26:

$$\dot{\gamma} = \left(\frac{3N + 1}{4N}\right)\frac{8V}{D} \tag{26}$$

Shear stress ($\tau_w$) can, for example, be determined by a curve-fitting model (for example, a Herschel-Bulkley model: $\tau_w=\tau_y+K\times\dot{\gamma}^n$), in which $\tau_y$, K, and n are known constants for a given fluid. Apparent (equivalent) viscosity can, for example, be calculated by Equation 27:

$$\mu_e = \frac{\tau_w}{\dot{\gamma}} \tag{27}$$

Reynolds number can, for example, be calculated by Equation 28:

$$Re = \frac{\rho V D}{\mu_e} \times \frac{4n}{n+1} \tag{28}$$

Reynolds numbers less than the "critical" Reynolds number can imply laminar flow regime for the fluid 101, while Reynolds numbers greater than the "critical" Reynolds number can imply turbulent flow regime for the fluid 101. Friction factor (f) can be determined by empirical correlation off versus Re. Once determined, the friction factor (f) can be used to calculate pressure loss for section(s) of pipe using conventional models (such as the Darcy-Weisbach equation). This inline instrument implementation can be repeated for other pipe sections of the apparatus 100A that have different inner diameters as desired.

Figure 2A:
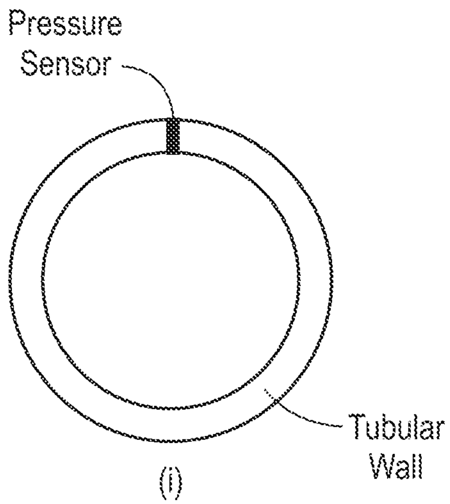
FIG. 2A is a schematic diagram depicting various example pressure tap arrangements.
Figure 2A:
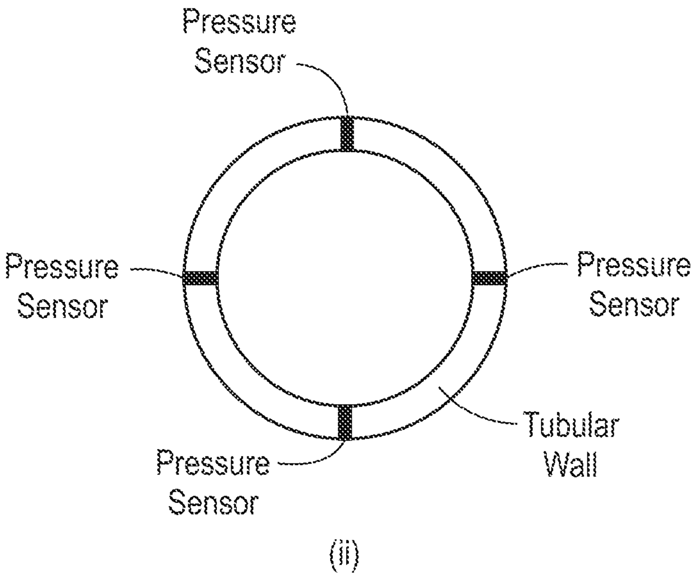
Figure 2A:
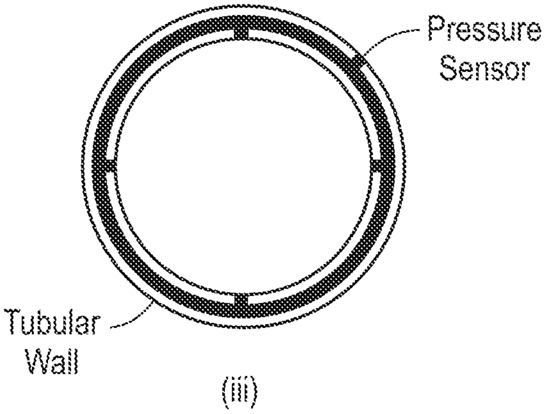

FIG. 2A is a schematic diagram depicting various example pressure tap arrangements. Each of the views (i), (ii), and (iii) are cross-sectional views of a pipe (for example, the first conduit 102*a*, the second conduit 102*b*, the first pipe 150*a*, or the second pipe 150*b*). Any of the pressure sensors (108*a*, 108*b*, 108*c*, 108*d*, 108*e*, 108*f*) can have the form shown in view (i), (ii), or (iii). In view (i), the pressure sensor includes a single pressure tap. In view (ii), the pressure sensor includes various pressure taps (for example, four) that are distributed around a circumference of the conduit. In view (ii), the pressure sensor can obtain four simultaneous readings (one at each of the four pressure taps) and average the four simultaneous readings to obtain an averaged pressure reading for that particular axial location along the conduit. Although shown in view (ii) as having four pressure taps, the pressure sensors can have fewer pressure taps (such as two or three) or more pressure taps (such as five or more than five). In view (iii), the pressure sensor includes a circumferential pressure tap that fully spans the entire circumference of the conduit. The circumferential pressure tap shown in view (iii) may be the most accurate out of all the views (i), (ii), and (iii) shown in FIG. 2A.

Figure 2B:
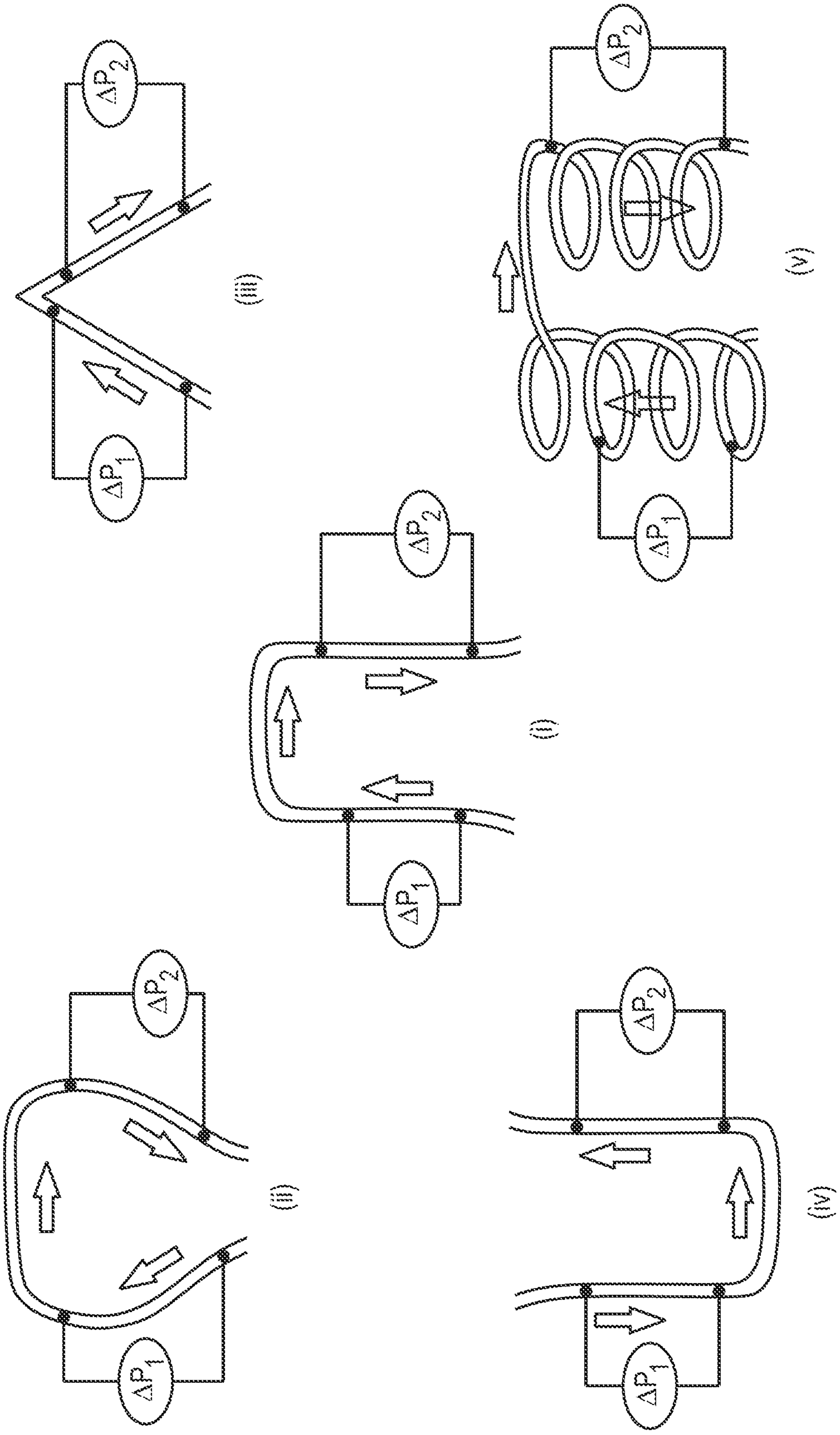
FIG. 2B is a schematic diagram depicting various example piping arrangements.

FIG. 2B is a schematic diagram depicting various example piping arrangements. Each of the views (i), (ii), (iii), (iv), and (v) depict piping arrangements that can used in addition to or alternatively to the piping arrangements already described with respect to the apparatuses 100A, 100B, and 100C. $\Delta P_1$ is a first differential pressure of the fluid 101 flowing through the respective piping arrangement. $\Delta P_2$ is a second differential pressure of the fluid 101 flowing through the respective piping arrangement. $\Delta P_1$ can be measured by a pair of pressure sensors or a single differential pressure sensor. Similarly, $\Delta P_2$ can be measured by a pair of pressure sensors or a single differential pressure sensor. The first and second differential pressures ($\Delta P_1$, $\Delta P_2$) measured from any of these piping arrangements can be used, for example, to determine characteristics (such as a mixture density, a total mass flow rate, an aqueous phase volume fraction, a gas phase volume fraction, or any combination of these) of the fluid 101 flowing through the respective piping arrangement.

As an example, view (i) can be considered a base case that generally conforms to the piping arrangements of apparatuses 100A, 100B, and 100C shown in FIGS. 1A, 1B, and IC, respectively. The piping arrangement of view (ii) is substantially similar to the piping arrangement of view (i), but the first and second conduits of view (ii) are not necessarily straight pipes. In view (iii), the connecting conduit (102*c*) is omitted, and the first and second conduits are connected by an angled bend. The piping arrangement of view (iv) is substantially similar to the piping arrangement of view (i), but is flipped vertically, such that the fluid 101 flowing through the piping arrangement of view (iv) flows downward before flowing upward. The piping arrangement of view (v) is substantially similar to the piping arrangement of view (i), but the first and second conduits are coiled (that is, includes coiled piping).

Figure 2C:
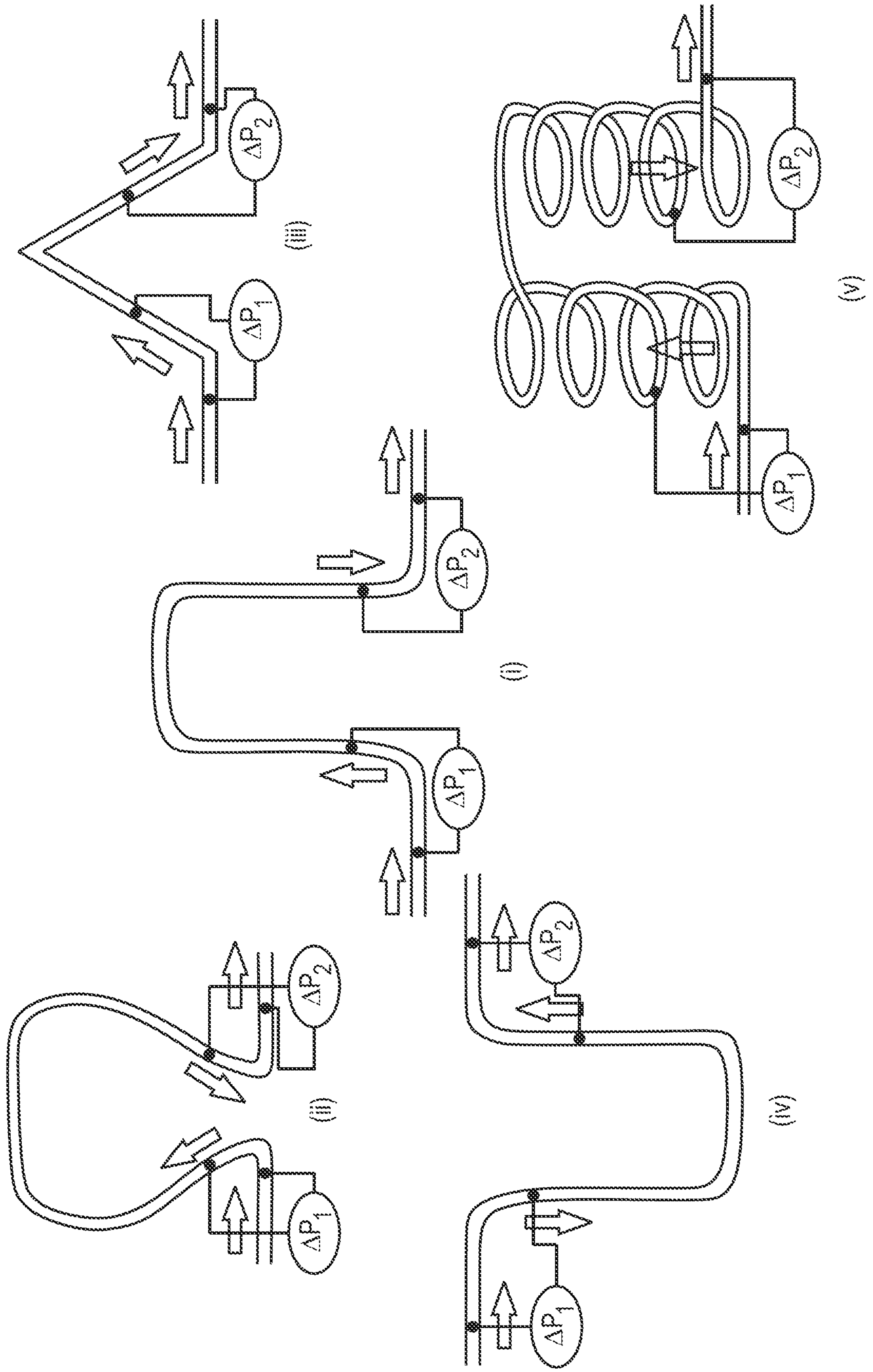
FIG. 2C is a schematic diagram depicting various example piping arrangements.

FIG. 2C is a schematic diagram depicting various example piping arrangements. Each of the views (i), (ii), (iii), (iv), and (v) depict piping arrangements that can used in addition to or alternatively to the piping arrangements already described with respect to the apparatuses 100A, 100B, and 100C. $\Delta P_1$ is a first differential pressure of the fluid 101 flowing through the respective piping arrangement across a first bend (curved or angled). $\Delta P_2$ is a second differential pressure of the fluid 101 flowing through the respective piping arrangement across a second bend (curved or angled). $\Delta P_1$ can be measured by a pair of pressure sensors or a single differential pressure sensor. Similarly, $\Delta P_2$ can be measured by a pair of pressure sensors or a single differential pressure sensor. The first and second differential pressures ($\Delta P_1$, $\Delta P_2$) measured from any of these piping arrangements can be used, for example, to determine characteristics (such as a mixture density, a total mass flow rate, or both) of the fluid 101 flowing through the respective piping arrangement.

As an example, view (i) can be considered a base case that generally conforms to the piping arrangements of apparatuses 100A, 100B, and 100C shown in FIGS. 1A, 1B, and IC, respectively. The piping arrangement of view (ii) is substantially similar to the piping arrangement of view (i), but the first and second conduits of view (ii) deviate from vertically oriented pipes (that is, they are disposed at non-zero angles with respect to a vertical) and are not necessarily straight pipes. Similarly, in view (iii), the first and second conduits deviate from vertically oriented pipes, but are straight pipes that are connected with angled bends. The piping arrangement of view (iv) is substantially similar to the piping arrangement of view (i), but is flipped vertically, such that the fluid 101 flowing through the piping arrangement of view (iv) flows downward before flowing upward. The piping arrangement of view (v) is substantially similar to the piping arrangement of view (i), but the first and second conduits are coiled (that is, includes coiled piping).

Figure 2D:
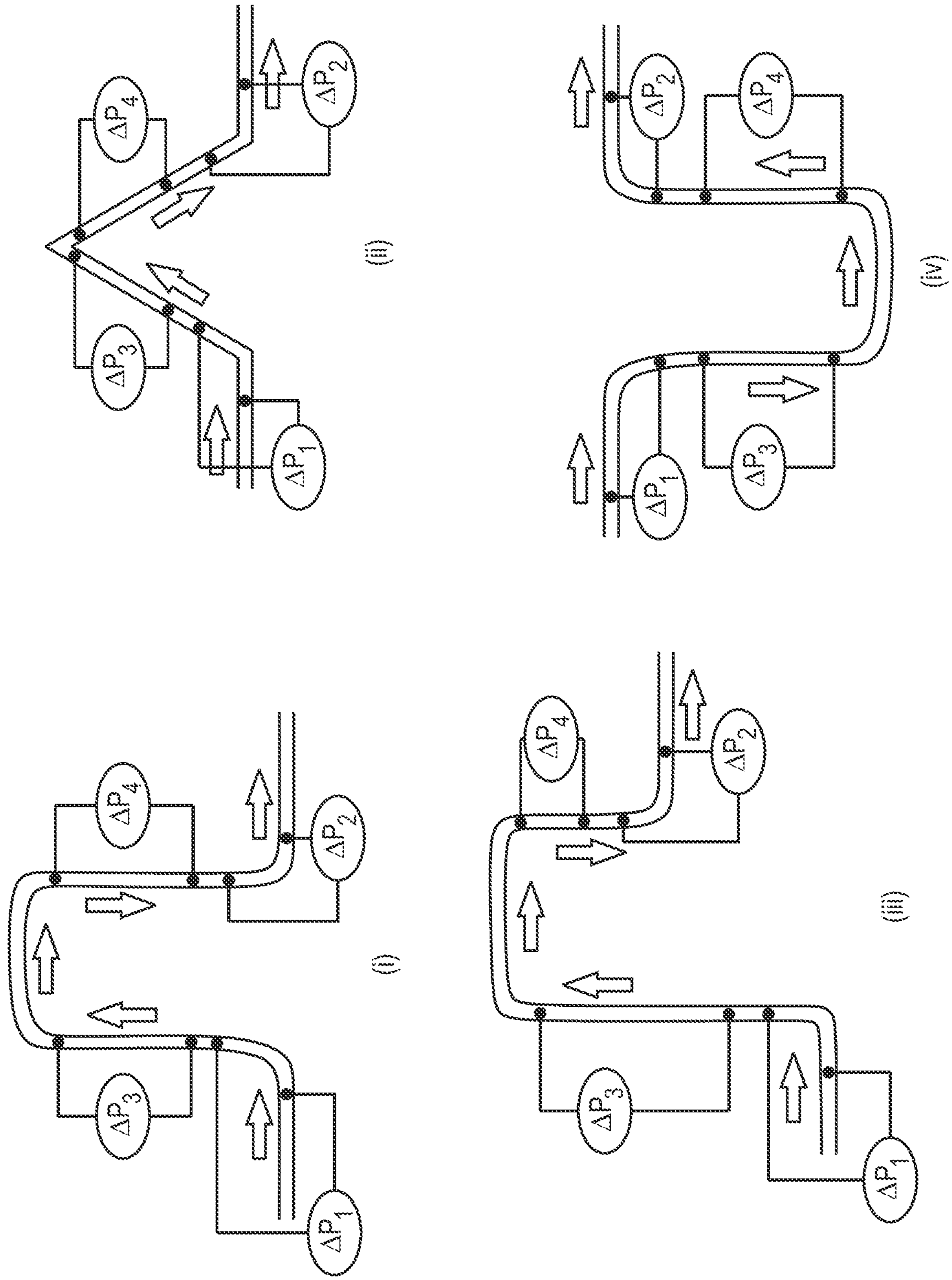
FIG. 2D is a schematic diagram depicting various example piping arrangements.

FIG. 2D is a schematic diagram depicting various example piping arrangements. Each of the views (i), (ii), (iii), and (iv) depict piping arrangements that can used in addition to or alternatively to the piping arrangements already described with respect to the apparatuses 100A, 100B, and 100C. $\Delta P_1$ is a first differential pressure of the fluid 101 flowing through the respective piping arrangement across a first bend (curved or angled). $\Delta P_2$ is a second differential pressure of the fluid 101 flowing through the respective piping arrangement across a second bend (curved or angled). $\Delta P_1$ can be measured by a pair of pressure sensors or a single differential pressure sensor. Similarly, $\Delta P_2$ can be measured by a pair of pressure sensors or a single differential pressure sensor. $\Delta P_3$ is a third differential pressure of the fluid 101 flowing through the first conduit 102*a* of the respective piping arrangement. $\Delta P_4$ is a fourth differential pressure of the fluid 101 flowing through the second conduit 102*b* of the respective piping arrangement. $\Delta P_3$ can be measured by a pair of pressure sensors or a single differential pressure sensor. Similarly, $\Delta P_4$ can be measured by a pair of pressure sensors or a single differential pressure sensor. The first, second, third, and fourth differential pressures ($\Delta P_1$, $\Delta P_2$, $\Delta P_3$, $\Delta P_4$) measured from any of these piping arrangements can be used, for example, to determine characteristics (such as a mixture density, a total mass flow rate, an aqueous phase volume fraction, a gas phase volume fraction, or any combination of these) of the fluid 101 flowing through the respective piping arrangement.

As an example, view (i) can be considered a base case that generally conforms to the piping arrangements of apparatuses 100A, 100B, and 100C shown in FIGS. 1A, 1B, and IC, respectively. The piping arrangement of view (ii) is substantially similar to the piping arrangement of view (i), but the first and second conduits of view (ii) deviate from vertically oriented pipes and are connected with angled bends. In the piping arrangement of view (iii), the first and second pipes of the flow pipe are not in-line with one another. The piping arrangement of view (iv) is substantially similar to the piping arrangement of view (i), but is flipped vertically, such that the fluid 101 flowing through the piping arrangement of view (iv) flows downward before flowing upward.

Figure 2E:
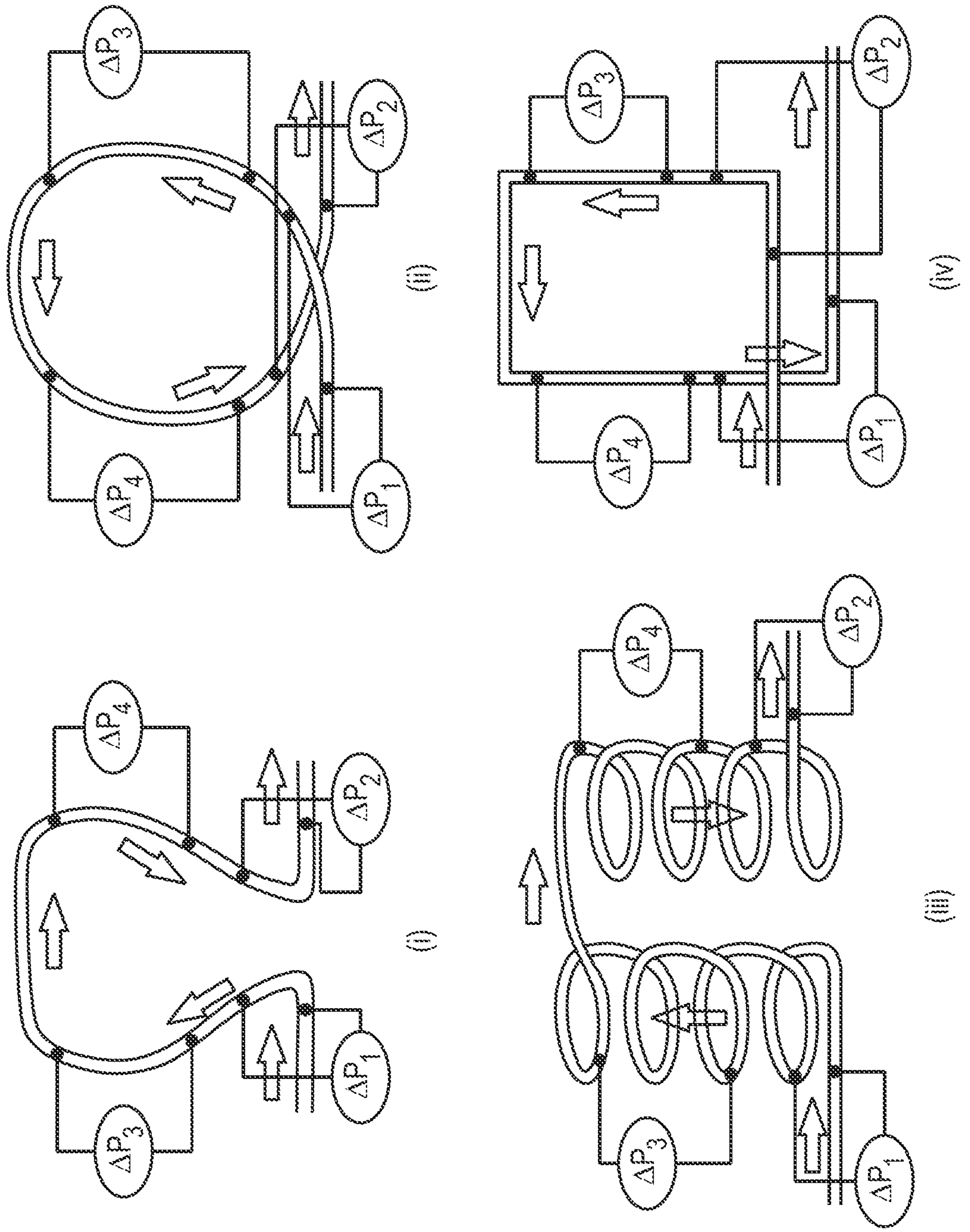
FIG. 2E is a schematic diagram depicting various example piping arrangements.

FIG. 2E is a schematic diagram depicting various example piping arrangements. Each of the views (i), (ii), (iii), and (iv) depict piping arrangements that can used in addition to or alternatively to the piping arrangements already described with respect to the apparatuses 100A, 100B, and 100C. $\Delta P_1$ is a first differential pressure of the fluid 101 flowing through the respective piping arrangement across a first bend (curved or angled). $\Delta P_2$ is a second differential pressure of the fluid 101 flowing through the respective piping arrangement across a second bend (curved or angled). $\Delta P_1$ can be measured by a pair of pressure sensors or a single differential pressure sensor. Similarly, $\Delta P_2$ can be measured by a pair of pressure sensors or a single differential pressure sensor. $\Delta P_3$ is a third differential pressure of the fluid 101 flowing through the first conduit 102*a* of the respective piping arrangement. $\Delta P_4$ is a fourth differential pressure of the fluid 101 flowing through the second conduit 102*b* of the respective piping arrangement. $\Delta P_3$ can be measured by a pair of pressure sensors or a single differential pressure sensor. Similarly, $\Delta P_4$ can be measured by a pair of pressure sensors or a single differential pressure sensor. The first, second, third, and fourth differential pressures ($\Delta P_1$, $\Delta P_2$, $\Delta P_3$, $\Delta P_4$) measured from any of these piping arrangements can be used, for example, to determine characteristics (such as a mixture density, a total mass flow rate, an aqueous phase volume fraction, a gas phase volume fraction, or any combination of these) of the fluid 101 flowing through the respective piping arrangement.

The piping arrangement of view (i) is substantially similar to the piping arrangements of apparatuses 100A, 100B, and 100C shown in FIGS. 1A, 1B, and IC, respectively, but the first and second conduits of view (i) are not necessarily straight pipes. In the piping arrangement of view (ii), the first and second conduits form a loop. The piping arrangement of view (iii) is substantially similar to the piping arrangement of view (i) of FIG. 2D, but the first and second conduits are coiled (that is, includes coiled piping). The piping arrangement of view (iv) is substantially similar to the piping arrangement of view (ii), but the first and second conduits form an angled loop with straight portions of piping in between angled bends. Further, in the piping arrangement of view (iv), the first and second pipes are not in-line with one another.

Figure 2F:
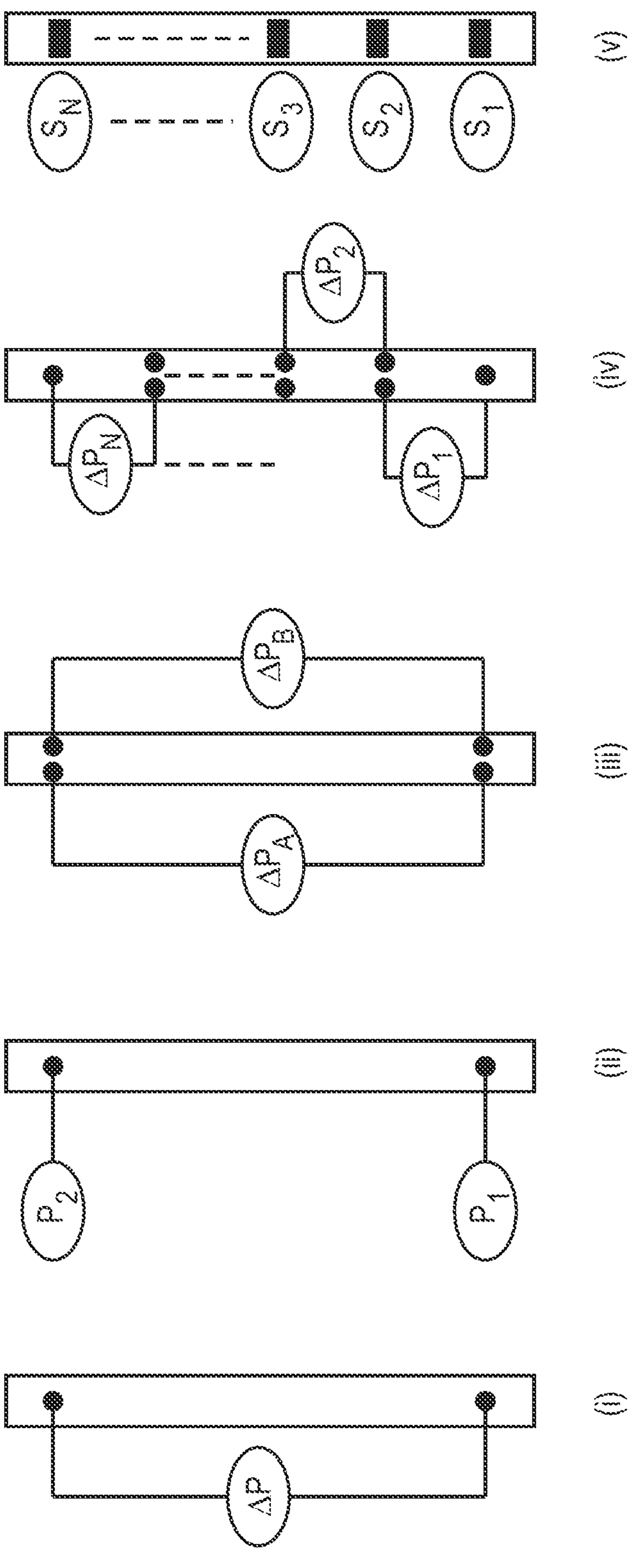
FIG. 2F is a schematic diagram depicting various example sensor arrangements.

FIG. 2F is a schematic diagram depicting various example sensor arrangements. Any of the sensor arrangements shown in views (i), (ii), (iii), (iv), and (v) can be applied (either alone or in combination) in addition to or alternatively to the sensor arrangements already described with respect to the apparatuses 100A, 100B, and 100C.

As an example, view (i) can be considered a base case with a differential pressure sensor. The pressure sensor arrangement of view (ii) includes two pressure sensors which measure static pressure at their respective locations. A difference between the measured static pressures can be determined as a differential pressure (similar to the differential pressure sensor). The differential pressure sensor arrangement of view (iii) is substantially similar to the view (i) but includes redundant differential pressure sensors in a parallel configuration across the same length of piping. The differential pressure sensor arrangement of view (iv) is substantially similar to the differential pressure sensor arrangement of view (i), but includes additional differential pressure sensors in a series configuration across a length of piping. The sensor arrangement of view (v) includes multiple strain sensors (such as strain gauges) disposed along a length of piping. The measured strain can be correlated to pressure, such that similar calculations can be completed to determine characteristics of the flowing fluid 101.

Figure 3:
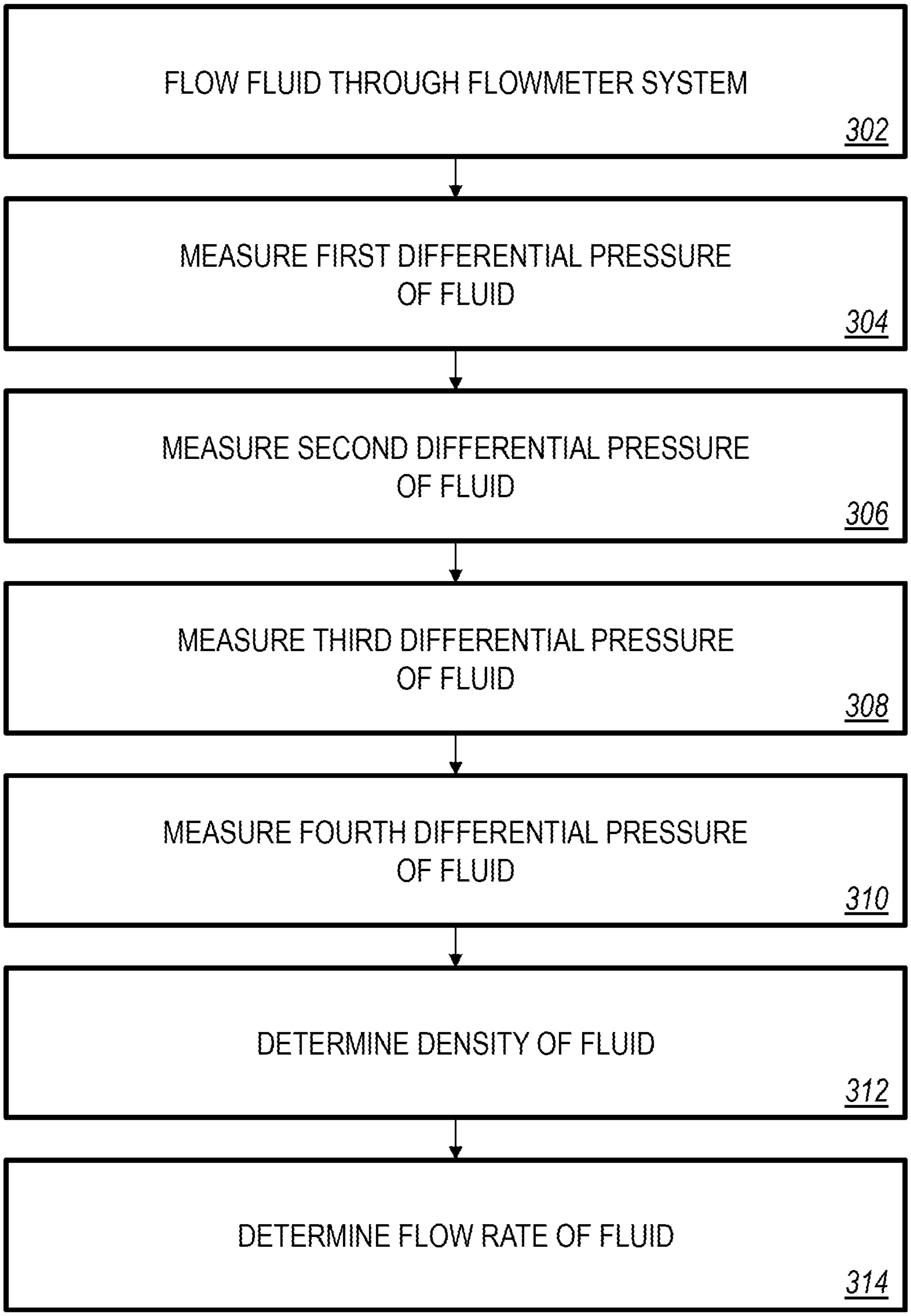
FIG. 3 is a flowchart of an example method for determining a density and flow rate of a multiphase fluid.

FIG. 3 is a flow chart of an example method 300 for flow metering of a fluid, such as the fluid 101. Any of the apparatuses 100A or 100B can, for example, be used to implement the method 300. At block 302, a fluid (such as the fluid 101) is flowed through a flowmeter system (such as the apparatus 100A or 100B). As described previously, the fluid 101 can be a 2-phase or 3-phase fluid. For example, the fluid 101 includes a gas phase 101*a*, an aqueous phase 101*b*', an oil phase 101*b*", or any combinations of these. For simplicity and clarity, the method 300 is described in relation to apparatus 100A, even though apparatus 100B can additionally or alternatively be used. As described previously, the apparatus 100A includes a first conduit (150*a*), a second conduit (150*b*), and a U-bend (102). The U-bend 102 includes a first portion (102*a*), a second portion (102*b*), and a connection portion (102*c*) that connects the first portion 102*a* to the second portion 102*b*. The U-bend 102 has a shape that changes a direction of flow of the fluid 101, such that a first direction of flow of the fluid 101 through the first portion 102*a* of the U-bend 102 is different from (for example, opposite of) a second direction of flow of the fluid 101 through the second portion 102*b* of the U-bend 102. The first conduit 150*a* is connected to the first portion 102*a* of the U-bend 102. The second conduit 150*b* is connected to the second portion 102*b* of the U-bend 102. As an example, the fluid 101 flows through the first conduit 150*a*, then through the first portion 102*a* of the U-bend 102, then through the connecting portion 102*c* of the U-bend 102, then through the second portion 102*b* of the U-bend 102, and then through the second conduit 150*b* at block 302.

At block 304, a first differential pressure of the fluid 101 flowing through the flowmeter system 100A (block 302) is measured between a first location (such as the pressure port 105*a*) on the first conduit 150*a* and a second location (such as the pressure port 105*b*) on the first portion 102*a* of the U-bend 102. The first differential pressure of the fluid 101 can be, for example, measured by the first differential pressure sensor 108*a*, coupled to the first conduit 150*a* via pressure port 105*a* and coupled to the first portion 102*a* of the U-bend 102 via pressure port 105*b*, at block 304. The second location (pressure port 105*b*) is at a first vertical height ($h_1$) with respect to the first location (pressure port 105*a*). In other words, the first location (pressure port 105*a*) and the second location (pressure port 105*b*) are separated by a vertical distance equal to the first vertical height, $h_1$.

At block 306, a second differential pressure of the fluid 101 flowing through the flowmeter system 100A (block 302) is measured between the first location (pressure port 105*a*) on the first conduit 150*a* and a third location (such as the pressure port 105*c*) on the first portion 102*a* of the U-bend 102. The second differential pressure of the fluid 101 can be, for example, measured by the second differential pressure sensor 108*b*, coupled to the first conduit 150*a* via pressure port 105*a* and coupled to the first portion 102*a* of the U-bend 102 via pressure port 105*c*, at block 306. The third location (pressure port 105*c*) is at a second vertical height ($h_2$) with respect to the first location (pressure port 105*a*). In other words, the first location (pressure port 105*a*) and the third location (pressure port 105*c*) are separated by a vertical distance equal to the second vertical height, $h_2$.

At block 308, a third differential pressure of the fluid 101 flowing through the flowmeter system 100A (block 302) is measured between the second location (pressure port 105*b*) on the first portion 102*a* of the U-bend 102 and a fourth location (such as the pressure port 105*d*) on the second portion 102*a* of the U-bend 102. The third differential pressure of the fluid 101 can be, for example, measured by the third differential pressure sensor 108*c*, coupled to the first portion 102*a* of the U-bend 102 via pressure port 105*b* and coupled to the second portion 102*b* of the U-bend 102 via pressure port 105*d*, at block 308. The fourth location (pressure port 105*d*) is at the first vertical height ($h_1$) with respect to the first location (pressure port 105*a*). In other words, the first location (pressure port 105*a*) and the fourth location (pressure port 105*d*) are separated by a vertical distance equal to the first vertical height, $h_1$. Since both the second location (pressure port 105*b*) and the fourth location (pressure port 105*d*) are at the first vertical height ($h_1$) with respect to the first location (pressure port 105*a*), the second location (pressure port 105*b*) and the fourth location (pressure port 105*d*) are located at the same vertical height with respect to gravity.

At block 310, a fourth differential pressure of the fluid 101 flowing through the flowmeter system 100A (block 302) is measured between the third location (pressure port 105*c*) on the first portion 102*a* of the U-bend 102 and a fifth location (such as the pressure port 105*c*) on the second portion 102*a* of the U-bend 102. The fourth differential pressure of the fluid 101 can be, for example, measured by the fourth differential pressure sensor 108*d*, coupled to the first portion 102*a* of the U-bend 102 via pressure port 105*c* and coupled to the second portion 102*b* of the U-bend 102 via pressure port 105*e*, at block 310. The fifth location (pressure port 105*c*) is at the second vertical height ($h_2$) with respect to the first location (pressure port 105*a*). In other words, the first location (pressure port 105*a*) and the fifth location (pressure port 105*e*) are separated by a vertical distance equal to the second vertical height, $h_2$. Since both the third location (pressure port 105*c*) and the fifth location (pressure port 105*e*) are at the second vertical height ($h_2$) with respect to the first location (pressure port 105*a*), the third location (pressure port 105*c*) and the fifth location (pressure port 105*e*) are located at the same vertical height with respect to gravity.

At block 312, a mixture density (p) of the fluid 101 is determined at least based on the first vertical height ($h_1$), the second vertical height ($h_2$), a difference between the first differential pressure (block 304) and the second differential pressure (block 306), and a difference between the third differential pressure (block 308) and the fourth differential pressure (block 310). Determining the mixture density of the fluid 101 at block 312 can be performed, for example, by the computer 600. The computer 600 can, for example, perform calculations of any combinations of Equations 1-13 to determine the mixture density of the fluid 101 at block 312.

At block 314, a total flow rate (m) of the fluid 101 is determined at least based on the first differential pressure (block 304), the mixture density of the fluid 101 (block 312), and the first vertical height ($h_1$). Determining the total flow rate of the fluid 101 at block 314 can be performed, for example, by the computer 600. The computer 600 can, for example, perform calculations of any combinations of Equations 1-13 to determine the total flow rate of the fluid 101 at block 314.

In some implementations, the method 300 includes measuring a fifth differential pressure of the fluid 101 between the fifth location (pressure port 105*e*) on the second portion 102*b* of the U-bend 102 and a sixth location (such as the pressure port 105*f*) on the second conduit 150*b*. The fifth differential pressure of the fluid 101 can be, for example, measured by the fifth differential pressure sensor 108*e*, coupled to the second portion 102*b* of the U-bend 102 via pressure port 105*e* and coupled to the second conduit 150*b* via pressure port 105*f*. The fifth location (pressure port 105*e*) is at the second vertical height ($h_2$) with respect to the sixth location (pressure port 105*f*). In other words, the fifth location (pressure port 105*c*) and the sixth location (pressure port 105*f*) are separated by a vertical distance equal to the second vertical height, $h_2$. In some implementations, the method 300 includes measuring a sixth differential pressure of the fluid 101 between the fourth location (pressure port 105*d*) on the second portion 102*b* of the U-bend 102 and the sixth location (pressure port 105*f*) on the second conduit 150*b*. The sixth differential pressure of the fluid 101 can be, for example, measured by the sixth differential pressure sensor 108*f*, coupled to the second portion 102*b* of the U-bend 102 via pressure port 105*d* and coupled to the second conduit 150*b* via pressure port 105*f*. The fourth location (pressure port 105*d*) is at the first vertical height ($h_1$) with respect to the sixth location (pressure port 105*f*). In other words, the fourth location (pressure port 105*d*) and the sixth location (pressure port 105*f*) are separated by a vertical distance equal to the first vertical height, $h_1$. In implementations in which the fifth and sixth differential pressures of the fluid 101 are measured, the mixture density of the fluid 101 determined at block 312 can be considered a first mixture density (1) of the fluid 101. In such implementations, the method 300 can include determining a second mixture density ($\rho_2$) of the fluid 101 at least based on the first vertical height ($h_1$), the second vertical height ($h_2$), a difference between the third differential pressure (block 308) and the fourth differential pressure (block 310), and a difference between the fifth differential pressure and the sixth differential pressure. The first and second mixture densities ($\rho_1$, $\rho_2$) of the fluid 101 can be calculated, for example, by the computer 600 by performing calculations of any combinations of Equations 1-18. The mixture density ($\rho$) of the fluid 101 can then be re-calculated as an average of the first mixture density ($\rho_1$) and the second mixture density ($\rho_2$). For example, the mixture density of the fluid 101 can be calculated as: $\rho=(\rho_1+\rho_2)/2$.

Figure 4:
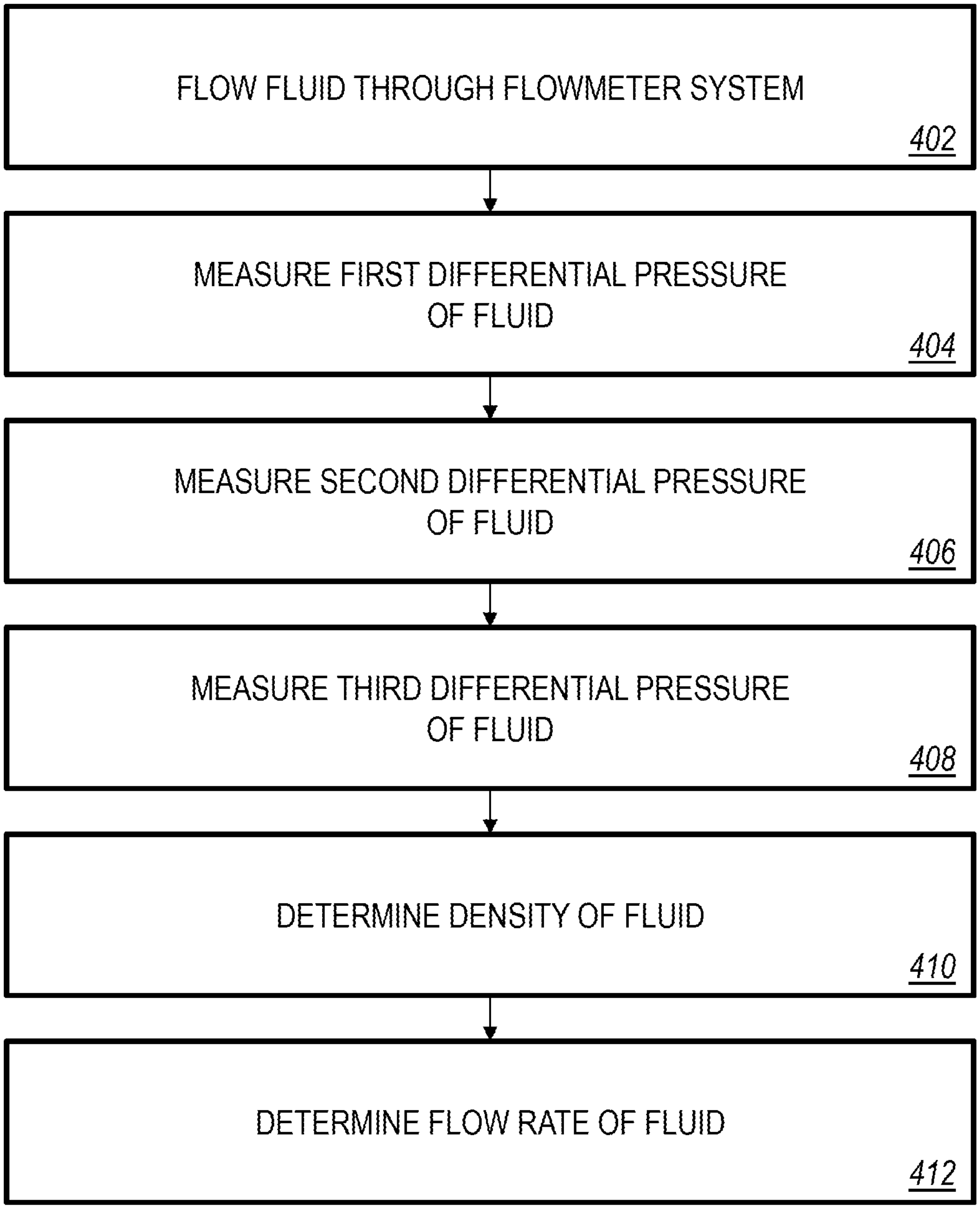
FIG. 4 is a flowchart of an example method for determining a density and flow rate of a multiphase fluid.

FIG. 4 is a flow chart of an example method 400 for flow metering of a fluid, such as the fluid 101. The apparatus 100C can, for example, be used to implement the method 400. At block 402, a fluid (such as the fluid 101) is flowed through a flowmeter system (such as the apparatus 100B). As described previously, the fluid 101 can be a 2-phase or 3-phase fluid. For example, the fluid 101 includes a gas phase 101*a*, an aqueous phase 101*b*', an oil phase 101*b*", or any combinations of these. Further, the fluid 101 can be a Newtonian fluid or a non-Newtonian fluid. As described previously, the apparatus 100C includes a first conduit (150*a*), a second conduit (150*b*), and a U-bend (102). The U-bend 102 includes a first portion (102*a*), a second portion (102*b*), and a connection portion (102*c*) that connects the first portion 102*a* to the second portion 102*b*. The U-bend 102 has a shape that changes a direction of flow of the fluid 101, such that a first direction of flow of the fluid 101 through the first portion 102*a* of the U-bend 102 is different from (for example, opposite of) a second direction of flow of the fluid 101 through the second portion 102*b* of the U-bend 102. The first conduit 150*a* is connected to the first portion 102*a* of the U-bend 102. The second conduit 150*b* is connected to the second portion 102*b* of the U-bend 102. As an example, the fluid 101 flows through the first conduit 150*a*, then through the first portion 102*a* of the U-bend 102, then through the connecting portion 102*c* of the U-bend 102, then through the second portion 102*b* of the U-bend 102, and then through the second conduit 150*b* at block 402.

At block 404, a first differential pressure of the fluid 101 flowing through the flowmeter system 100C (block 402) is measured between a first location (such as the pressure port 105*a*) on the first conduit 150*a* and a second location (such as the pressure port 105*b*) on the first portion 102*a* of the U-bend 102. The first differential pressure of the fluid 101 can be, for example, measured by the first differential pressure sensor 108*a*, coupled to the first conduit 150*a* via pressure port 105*a* and coupled to the first portion 102*a* of the U-bend 102 via pressure port 105*b*, at block 404. The second location (pressure port 105*b*) is at a first vertical height ($h_1$) with respect to the first location (pressure port 105*a*). In other words, the first location (pressure port 105*a*) and the second location (pressure port 105*b*) are separated by a vertical distance equal to the first vertical height, $h_1$.

At block 406, a second differential pressure of the fluid 101 flowing through the flowmeter system 100C (block 402) is measured between the second location (pressure port 105*b*) on the first portion 102*a* of the U-bend 102 and a third location (such as the pressure port 105*c*) on the first portion 102*a* of the U-bend 102. The second differential pressure of the fluid 101 can be, for example, measured by the second differential pressure sensor 108*b*, coupled to the first portion 102*a* of the U-bend 102 via pressure port 105*b* and coupled to the first portion 102*a* of the U-bend 102 via pressure port 105*c*, at block 406. The third location (pressure port 105*c*) is at a second vertical height ($h_2$) with respect to the first location (pressure port 105*a*). In other words, the first location (pressure port 105*a*) and the third location (pressure port 105*c*) are separated by a vertical distance equal to the second vertical height, $h_2$. As such, the second location (pressure port 105*b*) and the third location (pressure port 105*c*) are separated by a vertical distance equal to the difference between the second vertical height, $h_2$, and the first vertical height, $h_1$ ($h_2-h_1$).

At block 408, a third differential pressure of the fluid 101 flowing through the flowmeter system 100C (block 402) is measured between a fourth location (such as the pressure port 105*e*) on the second portion 102*a* of the U-bend 102 and a fifth location (such as the pressure port 105*d*) on the second portion 102*b* of the U-bend 102. The third differential pressure of the fluid 101 can be, for example, measured by the third differential pressure sensor 108*c*, coupled to the second portion 102*b* of the U-bend 102 via pressure port 105*e* and coupled to the second portion 102*b* of the U-bend 102 via pressure port 105*d*, at block 408. The fourth location (pressure port 105*c*) is at the second vertical height ($h_2$) with respect to the first location (pressure port 105*a*). In other words, the first location (pressure port 105*a*) and the fourth location (pressure port 105*c*) are separated by a vertical distance equal to the second vertical height, $h_2$. The fifth location (pressure port 105*d*) is at the first vertical height ($h_1$) with respect to the first location (pressure port 105*a*). In other words, the first location (pressure port 105*a*) and the fifth location (pressure port 105*d*) are separated by a vertical distance equal to the first vertical height, $h_1$. As such, the fourth location (pressure port 105*e*) and the fifth location (pressure port 105*e*) are separated by a vertical distance equal to the difference between the second vertical height, $h_2$, and the first vertical height, $h_1$ ($h_2-h_1$).

At block 410, a mixture density (p) of the fluid 101 is determined at least based on the first vertical height ($h_1$), the second vertical height ($h_2$), and a difference between the second differential pressure (block 406) and the third differential pressure (block 408). Determining the mixture density of the fluid 101 at block 410 can be performed, for example, by the computer 600. The computer 600 can, for example, perform calculations of Equation 9" to determine the mixture density of the fluid 101 at block 410.

At block 412, a total flow rate ($\dot{m}$) of the fluid 101 is determined at least based on the first differential pressure (block 404), the mixture density of the fluid 101 (block 410), and the first vertical height ($h_1$). Determining the total flow rate of the fluid 101 at block 412 can be performed, for example, by the computer 600. The computer 600 can, for example, perform calculations of any combinations of Equations 1-18 to determine the total flow rate of the fluid 101 at block 412. In some cases, the computer 600 can perform calculations of any combinations of Equations 1, 2', 2", 3, 4, and 9" to characterize rheology of the fluid 101.

Figure 5:
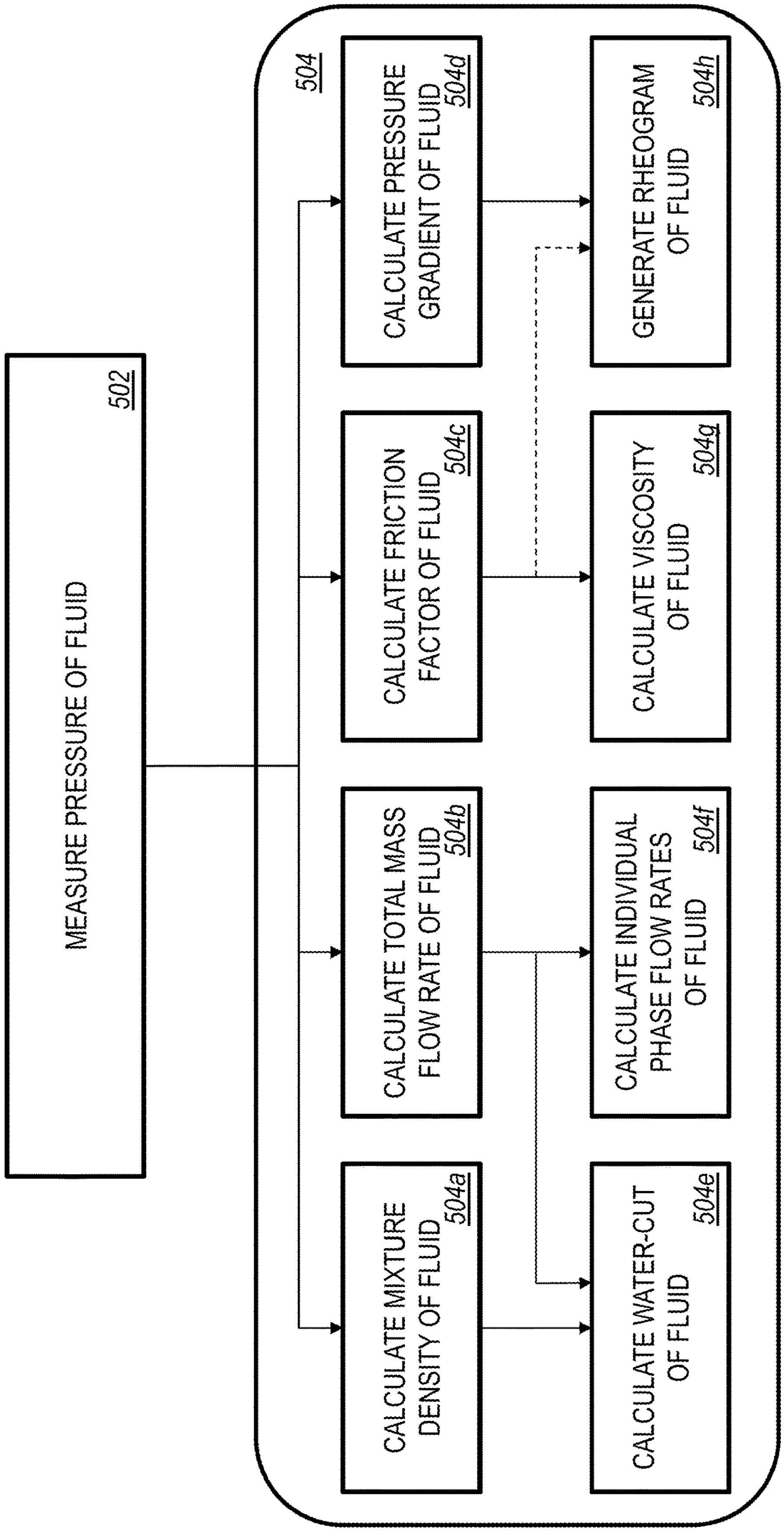
FIG. 5 is a flowchart of an example method for characterizing a multiphase fluid.

FIG. 5 is a flow chart of an example method 500 for characterizing a fluid, such as the fluid 101. Any of the apparatuses 100A, 100B, or 100C can, for example, be used to implement the method 500. At block 502, a differential pressure and/or pressure of the fluid 101 is measured. For example, the first differential pressure sensor 108*a* can measure a differential pressure of the fluid 101. In some cases, multiple differential pressures and/or pressures of the fluid 101 are measured at block 502. At block 504, the differential pressure and/or pressure of the fluid 101 measured at block 502 is used as input for various calculations to characterize rheology of the fluid 101. The computer 600 can, for example, perform the calculations at block 504. The calculations at block 504 can include any combination of calculations of Equations 1-28. In some implementations, block 504 includes calculating a mixture density (ρ) of the fluid 101 at block 504*a*. In performing block 504*a*, the apparatuses 100A, 100B, and 100C can perform a function of a densitometer. In some implementations, block 504 includes calculating a total mass flow rate ($\dot{m}$) of the fluid 101 at block 504*b*. In some implementations, block 504 includes calculating a friction factor (f) of the fluid 101 at block 504*c*. In some implementations, block 504 includes calculating a pressure gradient ($\Delta P/\Delta L$) of the fluid 101 at block 504*d*. In some implementations, block 504 includes calculating a water-cut (percentage of aqueous phase in a multiphase fluid free of a gas phase) of the fluid 101 at block 504*c*. Calculating the water-cut of the fluid 101 at block 504*c* can, for example, depend at least on the mixture density of the fluid 101 calculated at block 504*a*. In performing block 504*e*, the apparatuses 100A, 100B, and 100C can perform a function of a water-cut meter and/or water content analyzer. In some implementations, block 504 includes calculating individual phase flow rates (such as gas flow rate and liquid flow rate) of the fluid 101 at block 504*f*. Calculating the individual phase flow rates of the fluid 101 at block 504*f* can, for example, depend at least on the mixture density of the fluid 101 calculated at block 504*a* and the total mass flow rate of the fluid 101 calculated at block 504*b*. In performing block 504*f*, the apparatuses 100A, 100B, and 100C can perform a function of a multiphase flowmeter. In some implementations, block 504 includes calculating a viscosity of the fluid 101 at block 504*g*. Calculating the viscosity of the fluid 101 at block 504*g* can, for example, depend on the friction factor of the fluid 101 calculated at block 504*c*. Block 504*g* can be performed, for example, in cases in which the fluid 101 is a Newtonian fluid and/or a multiphase fluid. In performing block 504*g*, the apparatuses 100A, 100B, and 100C can perform a function of a viscometer. In some implementations, block 504 includes generating a rheogram of the fluid 101 at block 504*h*. Generating the rheogram of the fluid 101 at block 504*h* can include generating a plot of shear stress versus shear rate for the fluid 101. The rheogram of the fluid 101 generated at block 504*h* can include various curves of shear stress versus shear rate. Generating the rheogram of the fluid 101 at block 504*h* can, for example, depend at least on the pressure gradient of the fluid 101 calculated at block 504*d*. In some cases, block 504*h* includes generating a plot of friction factor versus Reynolds number. Generating the plot of friction factor versus Reynolds number at block 504*h* can, for example, depend at least on the friction factor of the fluid 101 calculated at block 504*c*. Block 504*h* can be performed for example, in cases in which the fluid 101 is a non-Newtonian fluid. In performing block 504*h*, the apparatuses 100A, 100B, and 100C can perform a function of a rheometer.

FIG. 6 is a block diagram of an example computer 600 used to provide computational functionalities associated with described algorithms, methods, functions, processes, flows, and procedures, as described in this specification, according to an implementation. The illustrated computer 600 is intended to encompass any computing device such as a server, desktop computer, laptop/notebook computer, one or more processors within these devices, or any other processing device, including physical or virtual instances (or both) of the computing device. Additionally, the computer 600 can include a computer that includes an input device, such as a keypad, keyboard, touch screen, or other device that can accept user information, and an output device that conveys information associated with the operation of the computer 600, including digital data, visual, audio information, or a combination of information.

The computer 600 includes a processor 605. The processor 605 may be a microprocessor, a multi-core processor, a multithreaded processor, an ultra-low-voltage processor, an embedded processor, or a virtual processor. In some embodiments, the processor 605 may be part of a system-on-a-chip (SoC) in which the processor 605 and the other components of the computer 600 are formed into a single integrated electronics package. In some implementations, the processor 605 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used. Although illustrated as a single processor 605 in FIG. 6, two or more processors may be used according to particular needs, desires, or particular implementations of the computer 600. Generally, the processor 605 executes instructions and manipulates data to perform the operations of the computer 600 and any algorithms, methods, functions, processes, flows, and procedures as described in this specification. The processor 605 may communicate with other components of the computer 600 over a bus. The bus may include any number of technologies, such as industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in an SoC based system. Other bus technologies may be used, in addition to, or instead of, the technologies above.

The computer 600 also includes a memory 607 that can hold data for the computer 600 or other components (or a combination of both) that can be connected to the network. Although illustrated as a single memory 607 in FIG. 6, two or more memories 607 (of the same or combination of types) can be used according to particular needs, desires, or particular implementations of the computer 600 and the described functionality. While memory 607 is illustrated as an integral component of the computer 600, memory 607 can be external to the computer 600. The memory 607 can be a transitory or non-transitory storage medium. In some implementations, such as in PLCs and other process control units, the memory 607 is integrated with the database 606 used for long-term storage of programs and data. The memory 607 can include any number of volatile and non-volatile memory devices, such as volatile random-access memory (RAM), static random-access memory (SRAM), flash memory, and the like. In smaller devices, such as PLCs, the memory 607 may include registers associated with the processor 605 itself. The memory 607 stores computer-readable instructions executable by the processor 605 that, when executed, cause the processor 605 to perform operations, such as receiving a first differential pressure signal from the first differential pressure sensor 108*a*; receiving a second differential pressure signal from the second differential pressure sensor 108*b*; receiving a third differential pressure signal from the third differential pressure sensor 108*c*; determining a mixture density of the fluid 101; and determining a total flow rate of the fluid 101.

EMBODIMENTS

In an example implementation (or aspect), a flowmeter system comprises: a first conduit configured to receive a fluid; a U-bend comprising a first portion, a second portion, and a connecting portion connecting the first portion to the second portion, wherein the U-bend has a shape configured to change a direction of flow of the fluid, such that a first direction of flow of the fluid through the first portion of the U-bend is different from a second direction of flow of the fluid through the second portion of the U-bend; a second conduit, wherein the first conduit is connected to the first portion of the U-bend, and the second conduit is connected to the second portion of the U-bend; a first differential pressure sensor configured to measure a first differential pressure of the fluid between a first location on the first conduit and a second location on the first portion of the U-bend, wherein the second location is at a first vertical height with respect to the first location; a second differential pressure sensor configured to measure a second differential pressure of the fluid between the first location on the first conduit and a third location on the first portion of the U-bend, wherein the third location is at a second vertical height with respect to the first location, wherein the first and second vertical heights are different; a third differential pressure sensor configured to measure a third differential pressure of the fluid between the second location of the first portion of the U-bend and a fourth location on the second portion of the U-bend, wherein the second location and the fourth location are at the first vertical height with respect to the first location; a fourth differential pressure sensor configured to measure a fourth differential pressure of the fluid between the third location on the first portion of the U-bend and a fifth location on the second portion of the U-bend, wherein the third location and the fifth location are at the second vertical height with respect to the first location; and a computer, comprising: a processor communicatively coupled to the first differential pressure sensor, the second differential pressure sensor, the third differential pressure sensor, and the fourth differential pressure sensor; and a computer-readable storage medium coupled to the processor and storing programming instructions for execution by the processor, the programming instructions instructing the processor to perform operations comprising: determining a mixture density of the fluid at least based on the first vertical height, the second vertical height, a difference between the first differential pressure received from the first differential pressure sensor and the second differential pressure received from the second differential pressure sensor, and a difference between the third differential pressure received from the third differential pressure sensor and the fourth differential pressure received from the fourth differential pressure sensor; and determining a total flow rate of the fluid at least based on the first differential pressure received from the first differential pressure sensor, the mixture density of the fluid, and the first vertical height.

In an example implementation (or aspect) combinable with any other example implementation (or aspect), wherein the mixture density of the fluid is determined by:

$$\rho = \frac{(\Delta p_2 - \Delta P_1) - \frac{\Delta P_3 - \Delta P_4}{2}}{g \times (h_2 - h_1)},$$

wherein ρ is the mixture density of the fluid, $\Delta P_1$ is the first differential pressure of the fluid, $\Delta P_2$ is the second differential pressure of the fluid, $\Delta P_3$ is the third differential pressure of the fluid, $\Delta P_4$ is the fourth differential pressure of the fluid, g is an acceleration due to gravity, $h_1$ is the first vertical height, and $h_2$ is the second vertical height.

In an example implementation (or aspect) combinable with any other example implementation (or aspect), wherein the total flow rate of the fluid is determined by:

$$m_T = C_d \times G_1 \times \sqrt{\rho \times (\Delta P_1 - \rho \times g \times h_1)},$$

wherein $m_T$ is the total flow rate of the fluid, $C_d$ is a discharge coefficient, and $G_1$ is a geometric coefficient defined as:

$$G_1 = \frac{\pi \times D^2 \times d^2}{\sqrt{8 \times (D^4 - d^4)}},$$

wherein D is an inner diameter of the first conduit, and d is an inner diameter of the first portion of the U-bend.

In an example implementation (or aspect) combinable with any other example implementation (or aspect), wherein the operations performed by the processor comprise determining a pressure gradient of the fluid determined by:

$$\nabla P = \frac{\Delta P_3 - \Delta P_4}{2 \times (h_2 - h_1)},$$

wherein ∇P is the pressure gradient of the fluid.

In an example implementation (or aspect) combinable with any other example implementation (or aspect), wherein the system further comprises a fifth differential pressure sensor configured to measure a fifth differential pressure of the fluid between the fifth location on the second portion of the U-bend and a sixth location on the second conduit, wherein the fifth location is at the second vertical height with respect to the sixth location.

In an example implementation (or aspect) combinable with any other example implementation (or aspect), wherein the system further comprises a sixth differential pressure sensor configured to measure a sixth differential pressure of the fluid between the fourth location on the second portion of the U-bend and the sixth location on the second conduit, wherein the fourth location is at the first vertical height with respect to the sixth location.

In an example implementation (or aspect) combinable with any other example implementation (or aspect), wherein the operations performed by the processor comprise determining a second mixture density of the fluid determined by:

$$\rho_2 = \frac{(\Delta P_5 - \Delta P_6) - \frac{\Delta P_3 - \Delta P_4}{2}}{g \times (h_2 - h_1)},$$

wherein $\rho_2$ is the second mixture density of the fluid, $\Delta P_5$ is the fifth differential pressure of the fluid, and $\Delta P_6$ is the sixth differential pressure of the fluid.

In an example implementation (or aspect) combinable with any other example implementation (or aspect), wherein the operations performed by the processor comprise recalculating the mixture density of the fluid as an average of ρ and $\rho_2$.

In an example implementation (or aspect) combinable with any other example implementation (or aspect), wherein: the fluid comprises a Newtonian fluid, and the operations performed by the processor comprise determining a viscosity of the fluid at least based on the first differential pressure, the second differential pressure, the third differential pressure, the fourth differential pressure, or any combinations thereof; the fluid comprises a non-Newtonian fluid, and the operations performed by the processor comprise generating a first plot of shear stress versus shear rate of the fluid and generating a second plot of friction factor versus Reynolds number of the fluid; or the fluid comprises a two-phase fluid comprising an aqueous phase and an oil phase, wherein the fluid is free of a gas phase, and the operations performed by the processor comprise determining a percentage of the aqueous phase to the fluid at least based on the first differential pressure, the second differential pressure, the third differential pressure, the fourth differential pressure, or any combinations thereof.

In an example implementation (or aspect), a flowmeter system comprises: a first conduit configured to receive a fluid; a U-bend comprising a first portion, a second portion, and a connecting portion connecting the first portion to the second portion, wherein the U-bend has a shape configured to change a direction of flow of the fluid, such that a first direction of flow of the fluid through the first portion of the U-bend is different from a second direction of flow of the fluid through the second portion of the U-bend; a second conduit, wherein the first conduit is connected to the first portion of the U-bend, and the second conduit is connected to the second portion of the U-bend; a first differential pressure sensor configured to measure a first differential pressure of the fluid between a first location on the first conduit and a second location on the first portion of the U-bend, wherein the second location is at a first vertical height with respect to the first location; a second differential pressure sensor configured to measure a second differential pressure of the fluid between the second location on the first portion of the U-bend and a third location on the first portion of the U-bend, wherein the third location is at a second vertical height with respect to the first location, wherein the first and second vertical heights are different; a third differential pressure sensor configured to measure a third differential pressure of the fluid between a fourth location on the second portion of the U-bend and a fifth location on the second portion of the U-bend, wherein the fourth location is at the second vertical height with respect to the first location, and the fifth location is at the first vertical height with respect to the first location; and a computer, comprising: a processor communicatively coupled to the first differential pressure sensor, the second differential pressure sensor, and the third differential pressure sensor; and a computer-readable storage medium coupled to the processor and storing programming instructions for execution by the processor, the programming instructions instructing the processor to perform operations comprising: determining a mixture density of the fluid at least based on the first vertical height, the second vertical height, and a difference between the second differential pressure received from the second differential pressure sensor and the third differential pressure received from the third differential pressure sensor; and determining a total flow rate of the fluid at least based on the first differential pressure received from the first differential pressure sensor, the mixture density of the fluid, and the first vertical height.

In an example implementation (or aspect) combinable with any other example implementation (or aspect), wherein the mixture density of the fluid is determined by:

$$\rho = \frac{(\Delta P_2 - \Delta P_3)}{2 \times g \times (h_2 - h_1)},$$

wherein ρ is the mixture density of the fluid, $\Delta P_2$ is the second differential pressure of the fluid, $\Delta P_3$ is the third differential pressure of the fluid, g is an acceleration due to gravity, $h_1$ is the first vertical height, and $h_2$ is the second vertical height.

In an example implementation (or aspect), a method comprises: flowing a fluid through a flowmeter system, wherein the flowmeter system comprises: a first conduit; a U-bend comprising a first portion, a second portion, and a connecting portion connecting the first portion to the second portion, wherein a shape of the U-bend changes a direction of flow of the fluid, such that a first direction of flow of the fluid through the first portion of the U-bend is different from a second direction of flow of the fluid through the second portion of the U-bend; and a second conduit, wherein the first conduit is connected to the first portion of the U-bend, and the second conduit is connected to the second portion of the U-bend; measuring a first differential pressure of the fluid flowing through the flowmeter system between a first location on the first conduit and a second location on the first portion of the U-bend, wherein the second location is at a first vertical height with respect to the first location; measuring a second differential pressure of the fluid flowing through the flowmeter system between the first location on the first conduit and a third location on the first portion of the U-bend, wherein the third location is at a second vertical height with respect to the first location, and the first and second vertical heights are different; measuring a third differential pressure of the fluid flowing through the flowmeter system between the second location on the first portion of the U-bend and a fourth location on the second portion of the U-bend, wherein the second location and the fourth location are at the first vertical height with respect to the first location; measuring a fourth differential pressure of the fluid flowing through the flowmeter system between the third location on the first portion of the U-bend and a fifth location on the second portion of the U-bend, wherein the third location and the fifth location are at the second vertical height with respect to the first location; determining a mixture density of the fluid at least based on the first vertical height, the second vertical height, a difference between the first differential pressure and the second differential pressure, and a difference between the third differential pressure and the fourth differential pressure; and determining a total flow rate of the fluid at least based on the first differential pressure, the mixture density of the fluid, and the first vertical height.

In an example implementation (or aspect) combinable with any other example implementation (or aspect), wherein the mixture density of the fluid is determined by:

$$\rho = \frac{(\Delta P_2 - \Delta P_1) - \frac{\Delta P_3 - \Delta P_4}{2}}{g \times (h_2 - h_1)},$$

wherein ρ is the mixture density of the fluid, $\Delta P_1$ is the first differential pressure of the fluid, $\Delta P_2$ is the second differential pressure of the fluid, $\Delta P_3$ is the third differential pressure of the fluid, $\Delta P_4$ is the fourth differential pressure of the fluid, g is an acceleration due to gravity, $h_1$ is the first vertical height, and $h_2$ is the second vertical height.

In an example implementation (or aspect) combinable with any other example implementation (or aspect), wherein the total flow rate of the fluid is determined by:

$$m_T = C_d \times G_1 \times \sqrt{\rho \times (\Delta P_1 - \rho \times g \times h_1)},$$

wherein $m_T$ is the total flow rate of the fluid, $C_d$ is a discharge coefficient, and $G_1$ is a geometric coefficient defined as:

$$G_1 = \frac{\pi \times D^2 \times d^2}{\sqrt{8 \times (D^4 - d^4)}},$$

wherein D is an inner diameter of the first conduit, and d is an inner diameter of the first portion of the U-bend.

In an example implementation (or aspect) combinable with any other example implementation (or aspect), wherein the method further comprises determining a pressure gradient of the fluid determined by:

$$\nabla P = \frac{\Delta P_3 - \Delta P_4}{2 \times (h_2 - h_1)},$$

wherein ∇P is the pressure gradient of the fluid.

In an example implementation (or aspect) combinable with any other example implementation (or aspect), wherein the method further comprises measuring a fifth differential pressure of the fluid between the fifth location on the second portion of the U-bend and a sixth location on the second conduit, wherein the fifth location is at the second vertical height with respect to the sixth location.

In an example implementation (or aspect) combinable with any other example implementation (or aspect), wherein the method further comprises measuring a sixth differential pressure sensor configured to measure a sixth differential pressure of the fluid between the fourth location on the second portion of the U-bend and the sixth location on the second conduit, wherein the fourth location is at the first vertical height with respect to the sixth location.

In an example implementation (or aspect) combinable with any other example implementation (or aspect), wherein the method further comprises determining a second mixture density of the fluid determined by:

$$\rho_2 = \frac{(\Delta P_5 - \Delta P_6) - \frac{\Delta P_3 - \Delta P_4}{2}}{g \times (h_2 - h_1)},$$

wherein $\rho_2$ is the second mixture density of the fluid, $\Delta P_5$ is the fifth differential pressure of the fluid, and $\Delta P_6$ is the sixth differential pressure of the fluid.

In an example implementation (or aspect) combinable with any other example implementation (or aspect), wherein the method further comprises recalculating the mixture density of the fluid as an average of $\rho$ and $\rho_2$.

In an example implementation (or aspect) combinable with any other example implementation (or aspect), wherein: the fluid comprises a Newtonian fluid, and the method further comprises determining a viscosity of the fluid at least based on the first differential pressure, the second differential pressure, the third differential pressure, the fourth differential pressure, or any combinations thereof; the fluid comprises a non-Newtonian fluid, and the method further comprises generating a first plot of shear stress versus shear rate of the fluid and generating a second plot of friction factor versus Reynolds number of the fluid; or the fluid comprises a two-phase fluid comprising an aqueous phase and an oil phase, wherein the fluid is free of a gas phase, and the method further comprises determining a percentage of the aqueous phase to the fluid at least based on the first differential pressure, the second differential pressure, the third differential pressure, the fourth differential pressure, or any combinations thereof.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A flowmeter system comprising:

a first conduit configured to receive a fluid;

a U-bend comprising a first portion, a second portion, and a connecting portion connecting the first portion to the second portion, wherein the U-bend has a shape configured to change a direction of flow of the fluid, such that a first direction of flow of the fluid through the first portion of the U-bend is different from a second direction of flow of the fluid through the second portion of the U-bend;

a second conduit, wherein the first conduit is connected to the first portion of the U-bend, and the second conduit is connected to the second portion of the U-bend;

a first differential pressure sensor configured to measure a first differential pressure of the fluid between a first location on the first conduit and a second location on the first portion of the U-bend, wherein the second location is at a first vertical height with respect to the first location;

a second differential pressure sensor configured to measure a second differential pressure of the fluid between the first location on the first conduit and a third location on the first portion of the U-bend, wherein the third location is at a second vertical height with respect to the first location, wherein the first and second vertical heights are different;

a third differential pressure sensor configured to measure a third differential pressure of the fluid between the second location of the first portion of the U-bend and a fourth location on the second portion of the U-bend, wherein the second location and the fourth location are at the first vertical height with respect to the first location;

a fourth differential pressure sensor configured to measure a fourth differential pressure of the fluid between the third location on the first portion of the U-bend and a fifth location on the second portion of the U-bend, wherein the third location and the fifth location are at the second vertical height with respect to the first location; and a computer, comprising:

a processor communicatively coupled to the first differential pressure sensor, the second differential pressure sensor, the third differential pressure sensor, and the fourth differential pressure sensor; and a computer-readable storage medium coupled to the processor and storing programming instructions for execution by the processor, the programming instructions instructing the processor to perform operations comprising:

determining a mixture density of the fluid at least based on the first vertical height, the second vertical height, a difference between the first differential pressure received from the first differential pressure sensor and the second differential pressure received from the second differential pressure sensor, and a difference between the third differential pressure received from the third differential pressure sensor and the fourth differential pressure received from the fourth differential pressure sensor; and determining a total flow rate of the fluid at least based on the first differential pressure received from the first differential pressure sensor, the mixture density of the fluid, and the first vertical height.

2. The system of claim 1, wherein the mixture density of the fluid is determined by:

$$\rho = \frac{(\Delta P_2 - \Delta P_1) - \frac{\Delta P_3 - \Delta P_4}{2}}{g \times (h_2 - h_1)},$$

wherein $\rho$ is the mixture density of the fluid, $\Delta P_1$ is the first differential pressure of the fluid, $\Delta P_2$ is the second differential pressure of the fluid, $\Delta P_3$ is the third differential pressure of the fluid, $\Delta P_4$ is the fourth differential pressure of the fluid, g is an acceleration due to gravity, $h_1$ is the first vertical height, and $h_2$ is the second vertical height.

3. The system of claim 2, wherein the total flow rate of the fluid is determined by:

$$m_T = C_d \times G_1 \times \sqrt{\rho \times (\Delta P_1 - \rho \times g \times h_1)},$$

wherein $m_T$ is the total flow rate of the fluid, $C_d$ is a discharge coefficient, and $G_1$ is a geometric coefficient defined as:

$$G_1 = \frac{\pi \times D^2 \times d^2}{\sqrt{8 \times (D^4 - d^4)}},$$

wherein D is an inner diameter of the first conduit, and d is an inner diameter of the first portion of the U-bend.

4. The system of claim 3, wherein the operations performed by the processor comprise determining a pressure gradient of the fluid determined by:

$$\nabla P = \frac{\Delta P_3 - \Delta P_4}{2 \times (h_2 - h_1)},$$

wherein $\nabla P$ is the pressure gradient of the fluid.

5. The system of claim 4, further comprising a fifth differential pressure sensor configured to measure a fifth differential pressure of the fluid between the fifth location on the second portion of the U-bend and a sixth location on the second conduit, wherein the fifth location is at the second vertical height with respect to the sixth location.

6. The system of claim 5, further comprising a sixth differential pressure sensor configured to measure a sixth differential pressure of the fluid between the fourth location on the second portion of the U-bend and the sixth location on the second conduit, wherein the fourth location is at the first vertical height with respect to the sixth location.

7. The system of claim 6, wherein the operations performed by the processor comprise determining a second mixture density of the fluid determined by:

$$\rho_2 = \frac{(\Delta P_5 - \Delta P_6) - \frac{\Delta P_3 - \Delta P_4}{2}}{g \times (h_2 - h_1)},$$

wherein $\rho_2$ is the second mixture density of the fluid, $\Delta P_5$ is the fifth differential pressure of the fluid, and $\Delta P_6$ is the sixth differential pressure of the fluid.

8. The system of claim 7, wherein the operations performed by the processor comprise recalculating the mixture density of the fluid as an average of $\rho$ and $\rho_2$.

9. The system of claim 8, wherein:

the fluid comprises a Newtonian fluid, and the operations performed by the processor comprise determining a viscosity of the fluid at least based on the first differential pressure, the second differential pressure, the third differential pressure, the fourth differential pressure, or any combinations thereof;

the fluid comprises a non-Newtonian fluid, and the operations performed by the processor comprise generating a first plot of shear stress versus shear rate of the fluid and generating a second plot of friction factor versus Reynolds number of the fluid; or the fluid comprises a two-phase fluid comprising an aqueous phase and an oil phase, wherein the fluid is free of a gas phase, and the operations performed by the processor comprise determining a percentage of the aqueous phase to the fluid at least based on the first differential pressure, the second differential pressure, the third differential pressure, the fourth differential pressure, or any combinations thereof.

10. A flowmeter system comprising:

a first conduit configured to receive a fluid;

a U-bend comprising a first portion, a second portion, and a connecting portion connecting the first portion to the second portion, wherein the U-bend has a shape configured to change a direction of flow of the fluid, such that a first direction of flow of the fluid through the first portion of the U-bend is different from a second direction of flow of the fluid through the second portion of the U-bend;

a second conduit, wherein the first conduit is connected to the first portion of the U-bend, and the second conduit is connected to the second portion of the U-bend;

a first differential pressure sensor configured to measure a first differential pressure of the fluid between a first location on the first conduit and a second location on the first portion of the U-bend, wherein the second location is at a first vertical height with respect to the first location;

a second differential pressure sensor configured to measure a second differential pressure of the fluid between the second location on the first portion of the U-bend and a third location on the first portion of the U-bend, wherein the third location is at a second vertical height with respect to the first location, wherein the first and second vertical heights are different;

a third differential pressure sensor configured to measure a third differential pressure of the fluid between a fourth location on the second portion of the U-bend and a fifth location on the second portion of the U-bend, wherein the fourth location is at the second vertical height with respect to the first location, and the fifth location is at the first vertical height with respect to the first location; and a computer, comprising:

a processor communicatively coupled to the first differential pressure sensor, the second differential pressure sensor, and the third differential pressure sensor; and a computer-readable storage medium coupled to the processor and storing programming instructions for execution by the processor, the programming instructions instructing the processor to perform operations comprising:

determining a mixture density of the fluid at least based on the first vertical height, the second vertical height, and a difference between the second differential pressure received from the second differential pressure sensor and the third differential pressure received from the third differential pressure sensor; and determining a total flow rate of the fluid at least based on the first differential pressure received from the first differential pressure sensor, the mixture density of the fluid, and the first vertical height.

11. The system of claim 10, wherein the mixture density of the fluid is determined by:

$$\rho = \frac{(\Delta P_2 - \Delta P_3)}{2 \times g \times (h_2 - h_1)},$$

wherein ρ is the mixture density of the fluid, $\Delta P_2$ is the second differential pressure of the fluid, $\Delta P_3$ is the third differential pressure of the fluid, g is an acceleration due to gravity, $h_1$ is the first vertical height, and $h_2$ is the second vertical height.

12. A method comprising:

flowing a fluid through a flowmeter system, wherein the flowmeter system comprises:

a first conduit;

a U-bend comprising a first portion, a second portion, and a connecting portion connecting the first portion to the second portion, wherein a shape of the U-bend changes a direction of flow of the fluid, such that a first direction of flow of the fluid through the first portion of the U-bend is different from a second direction of flow of the fluid through the second portion of the U-bend; and a second conduit, wherein the first conduit is connected to the first portion of the U-bend, and the second conduit is connected to the second portion of the U-bend;

measuring a first differential pressure of the fluid flowing through the flowmeter system between a first location on the first conduit and a second location on the first portion of the U-bend, wherein the second location is at a first vertical height with respect to the first location;

measuring a second differential pressure of the fluid flowing through the flowmeter system between the first location on the first conduit and a third location on the first portion of the U-bend, wherein the third location is at a second vertical height with respect to the first location, and the first and second vertical heights are different;

measuring a third differential pressure of the fluid flowing through the flowmeter system between the second location on the first portion of the U-bend and a fourth location on the second portion of the U-bend, wherein the second location and the fourth location are at the first vertical height with respect to the first location;

measuring a fourth differential pressure of the fluid flowing through the flowmeter system between the third location on the first portion of the U-bend and a fifth location on the second portion of the U-bend, wherein the third location and the fifth location are at the second vertical height with respect to the first location;

determining a mixture density of the fluid at least based on the first vertical height, the second vertical height, a difference between the first differential pressure and the second differential pressure, and a difference between the third differential pressure and the fourth differential pressure; and determining a total flow rate of the fluid at least based on the first differential pressure, the mixture density of the fluid, and the first vertical height.

13. The method of claim 12, wherein the mixture density of the fluid is determined by:

$$\rho = \frac{(\Delta P_2 - \Delta P_1) - \frac{\Delta P_3 - \Delta P_4}{2}}{g \times (h_2 - h_1)},$$

wherein ρ is the mixture density of the fluid, $\Delta P_1$ is the first differential pressure of the fluid, $\Delta P_2$ is the second differential pressure of the fluid, $\Delta P_3$ is the third differential pressure of the fluid, $\Delta P_4$ is the fourth differential pressure of the fluid, g is an acceleration due to gravity, $h_1$ is the first vertical height, and $h_2$ is the second vertical height.

14. The method of claim 13, wherein the total flow rate of the fluid is determined by:

$$m_T = C_d \times G_1 \times \sqrt{\rho \times (\Delta P_1 - \rho \times g \times h_1)},$$

wherein $m_T$ is the total flow rate of the fluid, $C_d$ is a discharge coefficient, and $G_1$ is a geometric coefficient defined as:

$$G_1 = \frac{\pi \times D^2 \times d^2}{\sqrt{8 \times (D^4 - d^4)}},$$

wherein D is an inner diameter of the first conduit, and d is an inner diameter of the first portion of the U-bend.

15. The method of claim 14, further comprising determining a pressure gradient of the fluid determined by:

$$\nabla P = \frac{\Delta P_3 - \Delta P_4}{2 \times (h_2 - h_1)},$$

wherein ∇P is the pressure gradient of the fluid.

16. The method of claim 15, further comprising measuring a fifth differential pressure of the fluid between the fifth location on the second portion of the U-bend and a sixth location on the second conduit, wherein the fifth location is at the second vertical height with respect to the sixth location.

17. The method of claim 16, further comprising measuring a sixth differential pressure sensor configured to measure a sixth differential pressure of the fluid between the fourth location on the second portion of the U-bend and the sixth location on the second conduit, wherein the fourth location is at the first vertical height with respect to the sixth location.

18. The method of claim 17, further comprising determining a second mixture density of the fluid determined by:

$$\rho_2 = \frac{(\Delta P_5 - \Delta P_6) - \frac{\Delta P_3 - \Delta P_4}{2}}{g \times (h_2 - h_1)},$$

wherein $\rho_2$ is the second mixture density of the fluid, $\Delta P_5$ is the fifth differential pressure of the fluid, and $\Delta P_6$ is the sixth differential pressure of the fluid.

19. The method of claim 18, further comprising recalculating the mixture density of the fluid as an average of ρ and $\rho_2$.

20. The method of claim 19, wherein:

the fluid comprises a Newtonian fluid, and the method further comprises determining a viscosity of the fluid at least based on the first differential pressure, the second differential pressure, the third differential pressure, the fourth differential pressure, or any combinations thereof;

the fluid comprises a non-Newtonian fluid, and the method further comprises generating a first plot of shear stress versus shear rate of the fluid and generating a second plot of friction factor versus Reynolds number of the fluid; or the fluid comprises a two-phase fluid comprising an aqueous phase and an oil phase, wherein the fluid is free of a gas phase, and the method further comprises determining a percentage of the aqueous phase to the fluid at least based on the first differential pressure, the second differential pressure, the third differential pressure, the fourth differential pressure, or any combinations thereof.

* * * * *